United States Patent [19]
Egawa

[11] Patent Number: 5,184,161
[45] Date of Patent: Feb. 2, 1993

[54] CAMERA WITH MAGNETIC RECORDING DEVICE

[75] Inventor: Akira Egawa, Kawasaki, Japan

[73] Assignee: Canon Kabushiki Kaisha, Tokyo, Japan

[21] Appl. No.: 756,316

[22] Filed: Sep. 6, 1991

[30] Foreign Application Priority Data

| Sep. 7, 1990 | [JP] | Japan | 2-235586 |
| Sep. 7, 1990 | [JP] | Japan | 2-235587 |
| Sep. 7, 1990 | [JP] | Japan | 2-235588 |
| Sep. 7, 1990 | [JP] | Japan | 2-235590 |
| Sep. 7, 1990 | [JP] | Japan | 2-235591 |
| Apr. 1, 1991 | [JP] | Japan | 3-068473 |
| Jul. 31, 1991 | [JP] | Japan | 3-192029 |

[51] Int. Cl.$^5$ .............................................. G03B 17/24
[52] U.S. Cl. .................................. 354/105; 354/173.1
[58] Field of Search ............. 354/21, 105, 106, 173.1, 354/173.11, 212, 214, 218

[56] References Cited

U.S. PATENT DOCUMENTS 4,864,332  9/1989  Harvey ............................ 354/105 X
4,973,996 11/1990  Harvey ........................ 354/173.1 X Primary Examiner—Michael L. Gellner
Assistant Examiner—Howard B. Blankenship
Attorney, Agent, or Firm—Fitzpatrick, Cella, Harper & Scinto

[57] ABSTRACT

This invention discloses a camera for recording information on a magnetic member provided on a film, in the course of feeding of the film. In such camera, this invention predicts the frame feeding speed, and controls the magnetic recording operation according to thus predicted feeding speed at the frame feeding of the film.

27 Claims, 22 Drawing Sheets

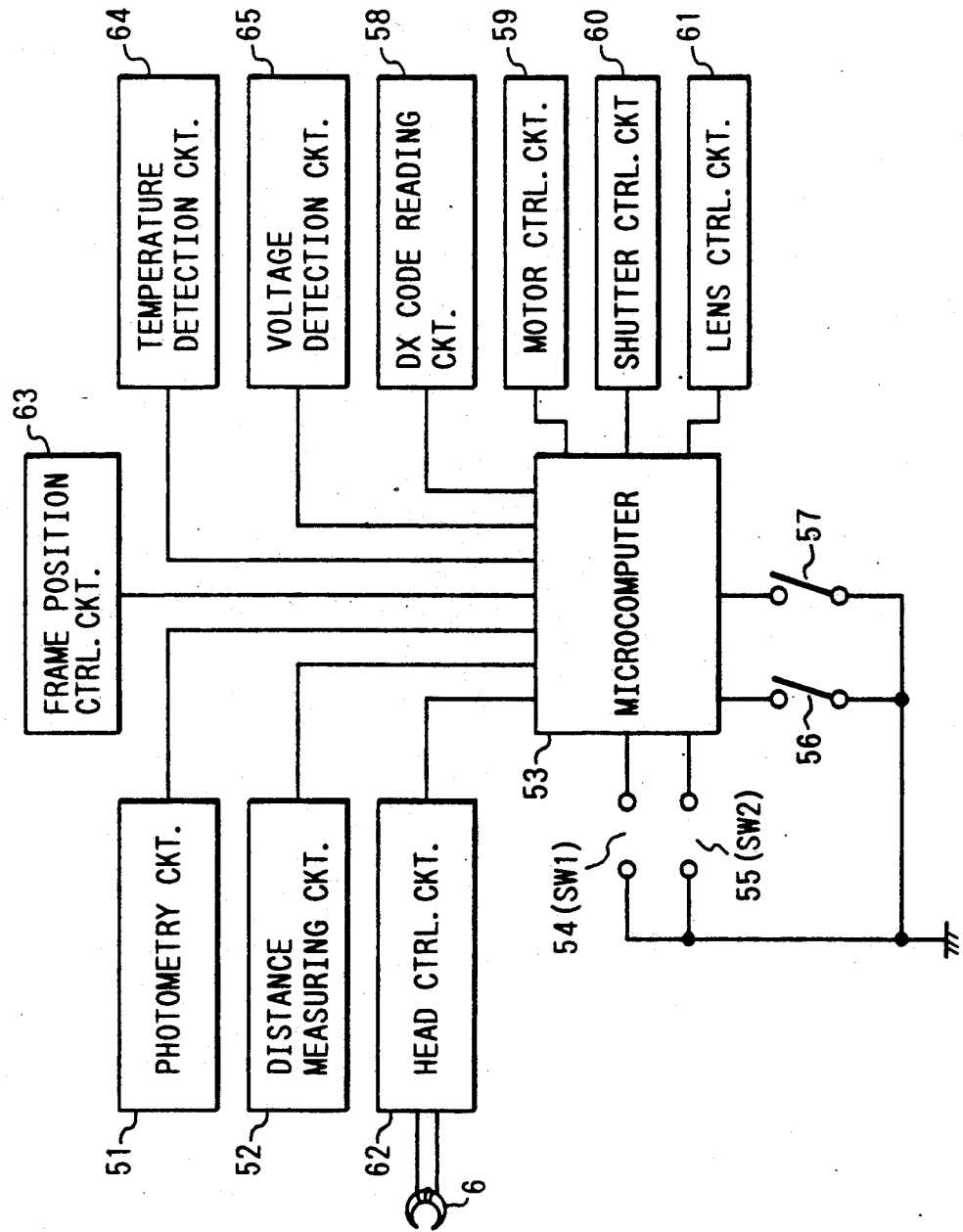

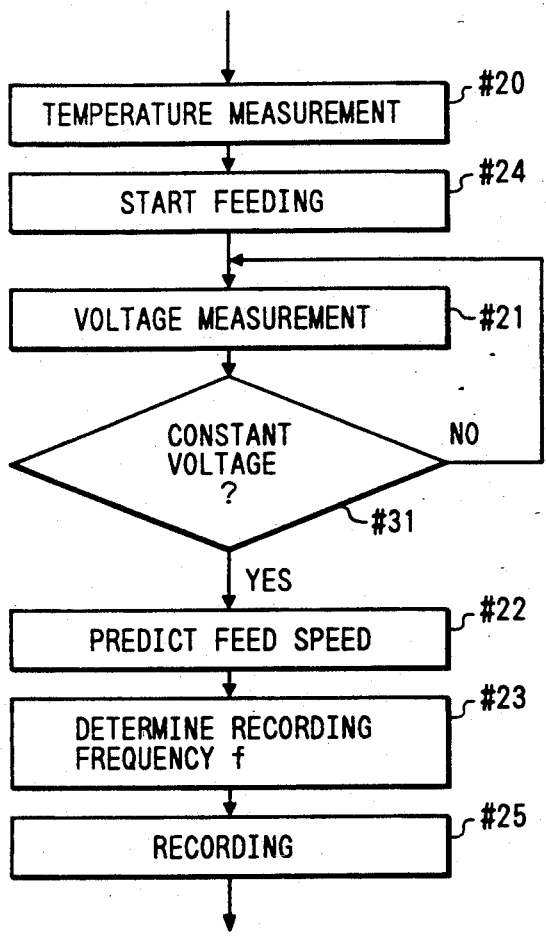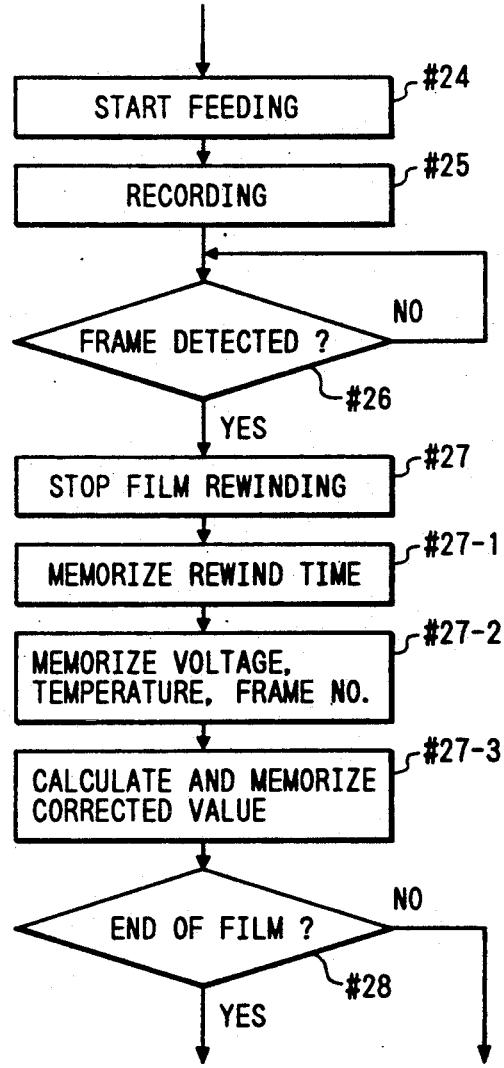

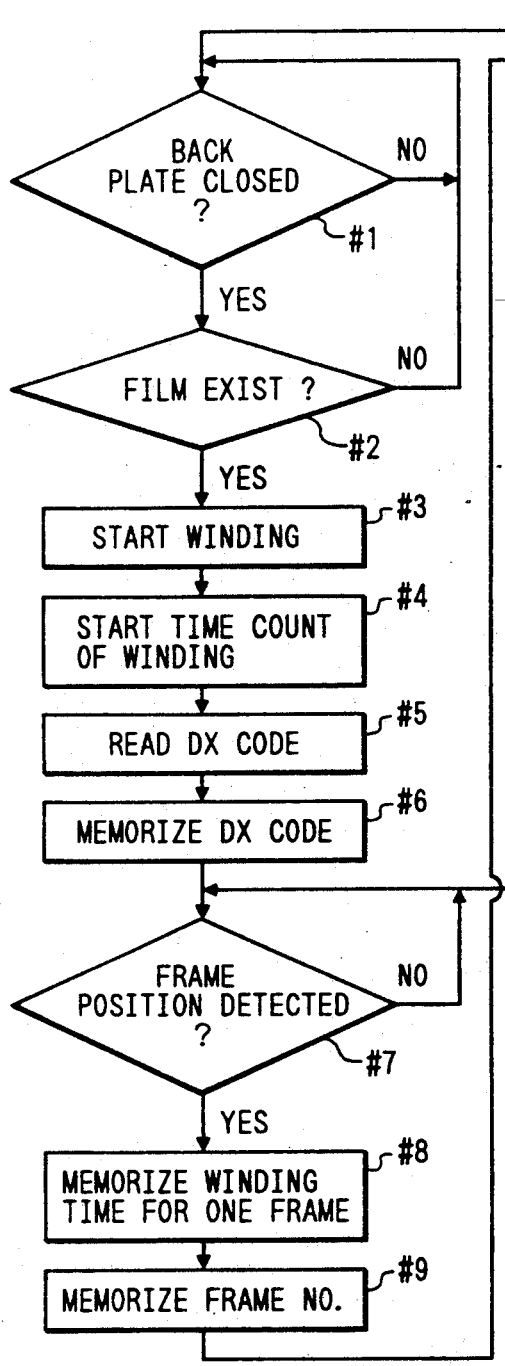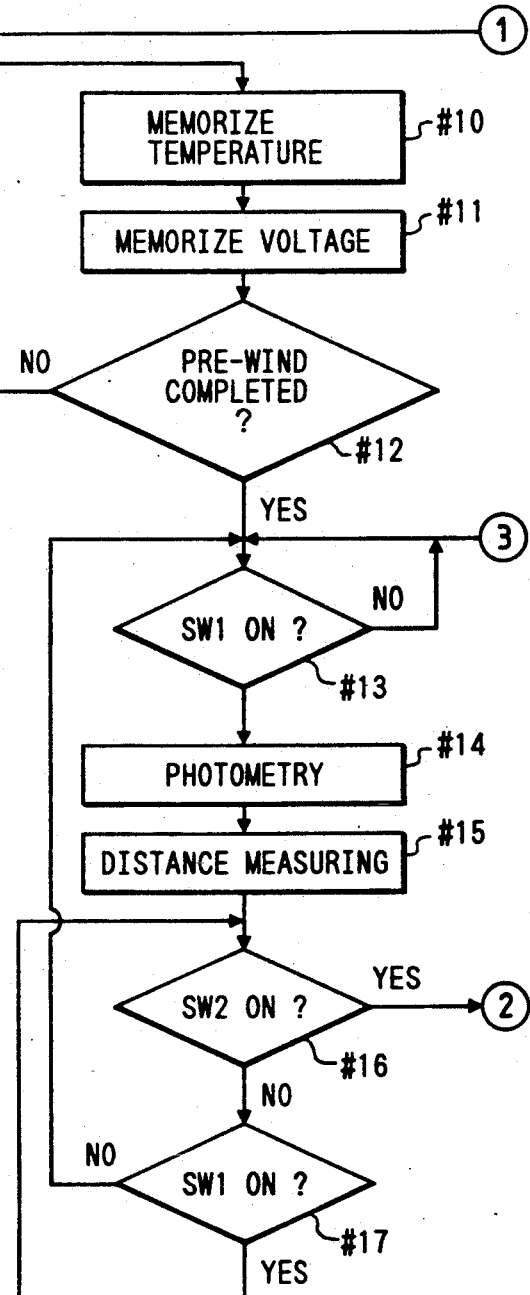
FIG. 25
| FIG. 25A | FIG. 25B |
FIG. 25A

CAMERA WITH MAGNETIC RECORDING DEVICE

BACKGROUND OF THE INVENTION

1. Field of the Invention

The present invention relates to an improvement in a camera equipped with a magnetic head for information recording in a magnetic memory part provided in a film and utilizing such film.

2. Related Background Art

In the conventional magnetic recording equipment, the recording with a proper density is enabled by advancement of a magnetic recording medium with a constant speed or by detection of the speed of a magnetic recording medium by an encoder.

On the other hand, there is already proposed, as disclosed in the U.S. Pat. No. 4,864,332, a camera capable of recording phototaking information such as shutter speed and diaphragm aperture value, by means of a magnetic head, in a magnetic memory area provided on a photographic film.

However, in such proposed camera, the information per image frame has to be recorded within a limited length of information recording defined for each image frame, and, for this purpose, there is required an expensive and complex encoder in such camera in which the constant-speed advancement is almost impossible.

Also there is proposed a camera capable of detecting the power supply voltage and employing a duty drive based on the detected voltage for maintaining the speed of film advancement as constant as possible, but this method is still insufficient for recording a large amount of information with a high density.

SUMMARY OF THE INVENTION

An aspect of the present application is to provide a camera employing a film with a magnetic memory area, capable of resolving the above-mentioned drawbacks and achieving high-density recording in a predetermined area without relying on an expensive and complex structure.

Another aspect of the present application is to provide a camera or a recording device therefor, provided with memory means for storing the film feeding speed in the course of a film feeding operation, and prediction means for predicting the film feeding speed of an image frame after a phototaking operation, based on the information from said memory means, wherein the information recording operation is controlled according to the predicted speed information.

Still another aspect of the present application is to provide, under the above-mentioned aspect, a camera or a recording device therefor, capable in said predicting operation, of predicting the film feeding speed in consideration of the current frame number information.

Still another aspect of the present application is to provide, under the above-mentioned aspects, a camera or a recording device therefor, capable of making said prediction in consideration of the information on current spool diameter.

Still another aspect of the present application is to provide, under the above-mentioned aspects, a camera or a recording device therefor, capable of making said prediction in consideration of the kind of film, temperature or a battery voltage.

Still another aspect of the present application is to provide, under the above-mentioned aspects, a camera or a recording device therefor, capable of making precise prediction by detecting the actual film feeding speed and effecting a feedback of the difference between said actual film feeding speed and the predicted speed to the predicting operation of the film feeding speed for a next image frame.

Still another aspect of the present application is to provide, under the above-mentioned aspects, a camera or a recording device therefor, capable, in said predicting operation, of making correction on the predicted value according to the time elapsed after the preceding film feeding operation.

Still another aspect of the present application is to provide, under the above-mentioned aspects, a camera of so-called pre-winding type or a recording device therefor, wherein, after a film pre-winding operation, the film is fed by a predetermined amount in a direction different from that in said pre-winding operation for determining the film feeding speed in said film feeding operation and the film is again pre-wound, and the film feeding speed after a phototaking operation is predicted, based on the film feeding speed determined in the film feeding in the direction different from that of pre-winding.

Still other aspects of the present invention will become fully apparent from the following description of the embodiments, which is to be taken in conjunction with the attached drawings.

BRIEF DESCRIPTION OF THE DRAWINGS

FIG. 4 is a block diagram of said camera;

FIG. 11 is a flow chart showing functions of principal units in another embodiment of the present invention;

FIG. 13 is a flow chart showing functions of principal units in still another embodiment of the present invention;

FIGS. 25, 25A, and 25B are flow charts showing control sequence of the embodiment shown in FIG. 24.

DESCRIPTION OF THE PREFERRED EMBODIMENTS

Now the present invention will be clarified in detail by embodiments thereof shown in the attached drawings.

Figure 1:
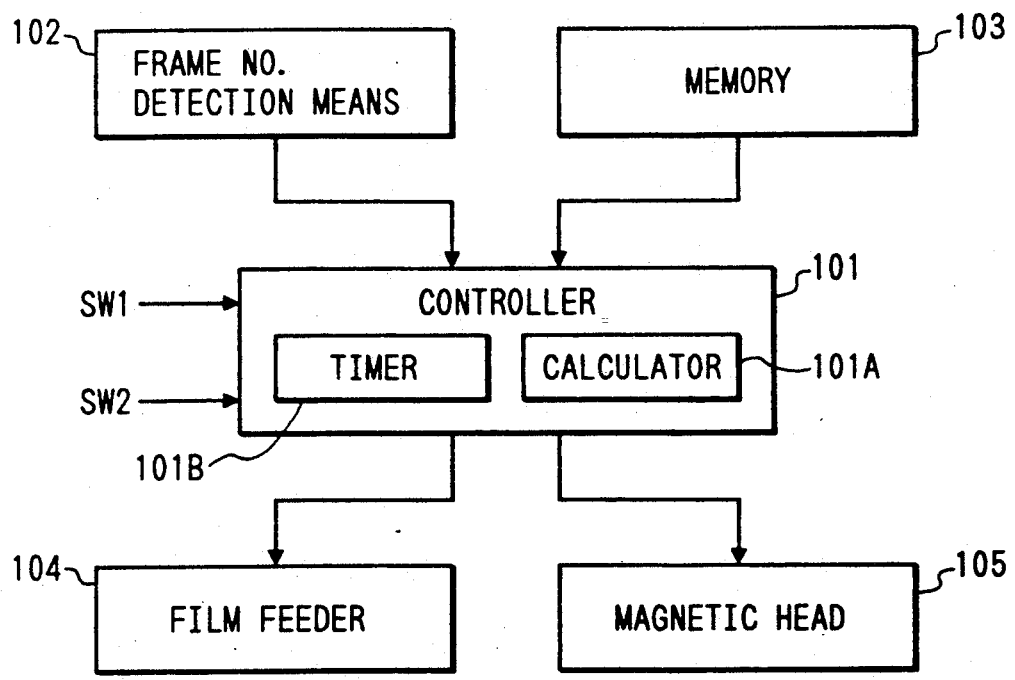
FIG. 1 is a schematic block diagram of an embodiment of the present invention.
Figure 2:
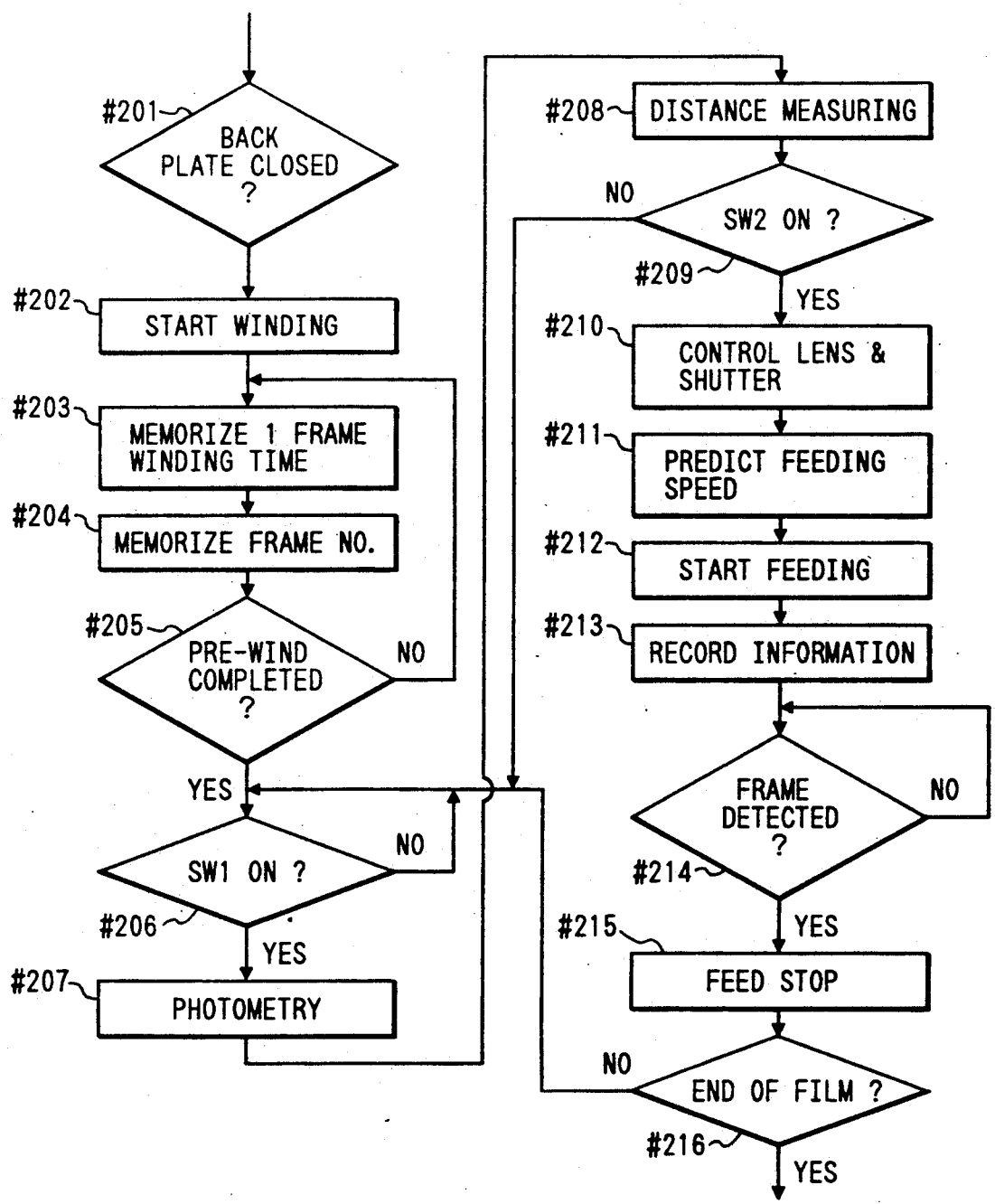
FIG. 2 is a flow chart showing the function thereof.

FIG. 1 is a schematic block diagram of an embodiment of the present invention, of which functions will be explained in the following with reference to a flow chart shown in FIG. 2. In the present embodiment there is assumed a camera of so-called pre-winding type, in which all the film is wound in the beginning and is re-wound frame by frame, at each phototaking operation.

At first a controller 101 discriminates, in a step 201, whether a rear cover has been closed, and, if in a closed state indicating that a film cartridge has been loaded, drives film feeding means 104 in a step 202 thereby starting the winding of a film provided with magnetic memory areas. Subsequent steps 203, 204 detect the current frame number and the time required for film winding of a frame, by means of frame number detection means 102 for detecting the frame number utilizing an unrepresented frame position detector, and a timer 101B, and store the obtained information in a memory 103. Said memory 103 stores the diameters of a film winding spool (for feeding the film to a frame to be photographed) and a spool in the cartridge (to which the frame after phototaking operation is fed). A next step 205 discriminates whether all the image frames of the film have been wound, namely whether the pre-winding operation has been completed, and, if not, the above-explained operations are repeated. Upon confirmation of completion of the pre-winding operation, the sequence proceeds to a step 206.

The step 206 discriminates the state of a switch SW1 to be turned on by the depression of a shutter release button over a first stroke, and, if turned on, steps 207, 208 activate unrepresented photometry means and distance measuring means to obtain information on measured light and distance. Then a step 209 discriminates the state of a switch SW2 to be turned on by the depression of said shutter release button over a second stroke, and, if turned on, a step 210 effects lens control and shutter control in known manner, thereby conducting a focusing operation and an exposure of the film.

In a next step 211, calculation means 101A in the controller 101 detects the current image frame number, based on the information from frame number detection means 102, and predicts the film feeding speed (more exactly film rewinding speed, as the pre-winding method is adopted in the present embodiment) for said image frame number. More specifically, as will be explained later, the calculator means 101A predicts the film feeding speed for the photographed frame, based on the information stored in the memory 103 in the aforementioned steps 203 and 204 and on the apparent change in the diameter of spool in the film cartridge estimated from the change in diameter of the film winding spool (said spool diameter increasing and the film feeding speed becoming larger with the progress of film winding operation).

In a next step 212, the controller 101 instructs the film feeding means 104 to effect film feeding according to said predicted feeding speed. Then a step 213 drives a magnetic head 105 to record various photographing information such as shutter time, diaphragm aperture, photographing date, comment etc. in the magnetic memory area of the film fed as explained above, with a recording frequency determined from the film feeding speed mentioned above.

A next step 214 discriminates whether the feeding of said photographed frame has been completed, and, if completed, a step 215 instructs the termination of film feeding to the film feeding means 104. Then a step 216 discriminates whether the film has come to the end, namely whether all the frames have been photographed, and, if not, the sequence returns to the step 206 to repeat the above-explained sequence. If all the frames have been photographed, there is initiated, as already known, an operation of rewinding the entire film into the film cartridge.

As explained in the foregoing, since the film feeding speed after phototaking operation is predicted, based on the winding time information for each frame stored in the memory 103 at the film winding operation and from the apparent change in the diameter of spool in the cartridge estimated from the change in the diameter of film winding spool, high-density information recording is rendered possible within a predetermined area, without an encoder of expensive and complex structure.

Figure 3:
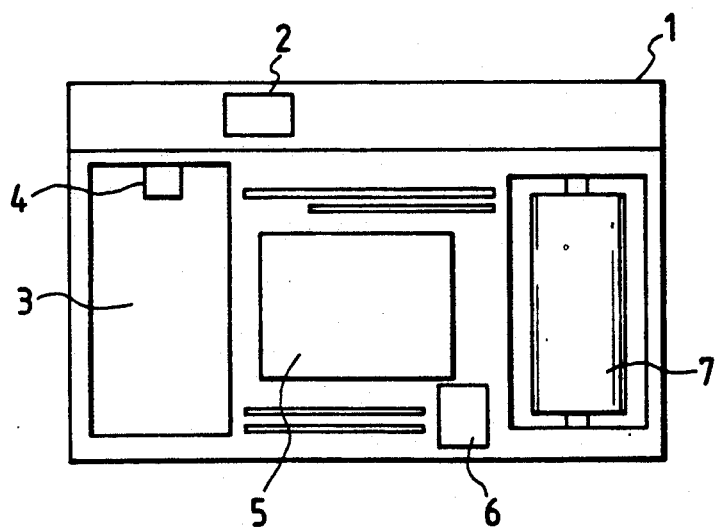
FIG. 3 is a rear view of a camera constituting the embodiment shown in FIGS. 1 and 2.

FIG. 3 is a rear view of a camera, without a rear cover, applicable to the embodiment explained above.

In FIG. 3 there are shown a camera body 1; a view finder 2; a film cartridge chamber 3; a fork member 4 for driving the spool in the film cartridge thereby rewinding the film; an aperture 5 for exposure; a magnetic head 6; and a film winding spool 7 to be driven for winding the film.

FIG. 4 is a schematic block diagram of said camera, wherein provided are a photometry circuit 51 for measuring the luminance of an object to be photographed; a distance measuring circuit 52 for measuring the distance to the object; a microcomputer 53 for controlling various circuits and provided therein with timer, ROM, RAM etc.; a switch 54 (SW1) to be turned on by the depression of an unrepresented shutter release button of the camera over a first stroke; a switch 55 (SW2) to be turned on by the depression of said shutter release button over a second stroke; a rear cover switch 56 to be turned on or off in relation to the opening or closing of the unrepresented rear cover; a switch 57 for detecting the presence or absence of the film cartridge; and a DX code reading circuit 58 for reading the number of frames of the film and the kind of film (for example film manufacturer, reversal or negative film, film sensitivity etc.) from a DX code provided on the film cartridge, thereby identifying the type of film base and the type of photosensitive emulsion and selecting correction values for the force required for extracting and rewinding the film from the RAM provided in the microcomputer 53.

There are further provided a motor control circuit 59 for controlling an unrepresented film feeding motor, for winding or re-winding the film respectively in the forward or reverse rotation; a shutter control circuit 60 for controlling the exposure to be given to the film; a lens control circuit 61 for controlling the position of a phototaking lens so as to focus to the object; a head control circuit 62 for controlling the magnetic head 6 shown in FIG. 3 for effecting the recording or readout of various information into or from the magnetic recording area provided on the film; a frame position detecting circuit 63 for detecting each frame on the frame, either by detecting the perforations of the film or the amount of movement of the film; a temperature detection circuit 64, which is constructed independently in the present embodiment but may be constructed together with the photometry circuit 51; and a voltage detection circuit 65 for detecting the battery voltage and transmitting the detected voltage after A/D conversion to the microcomputer 53.

Figure 5A:
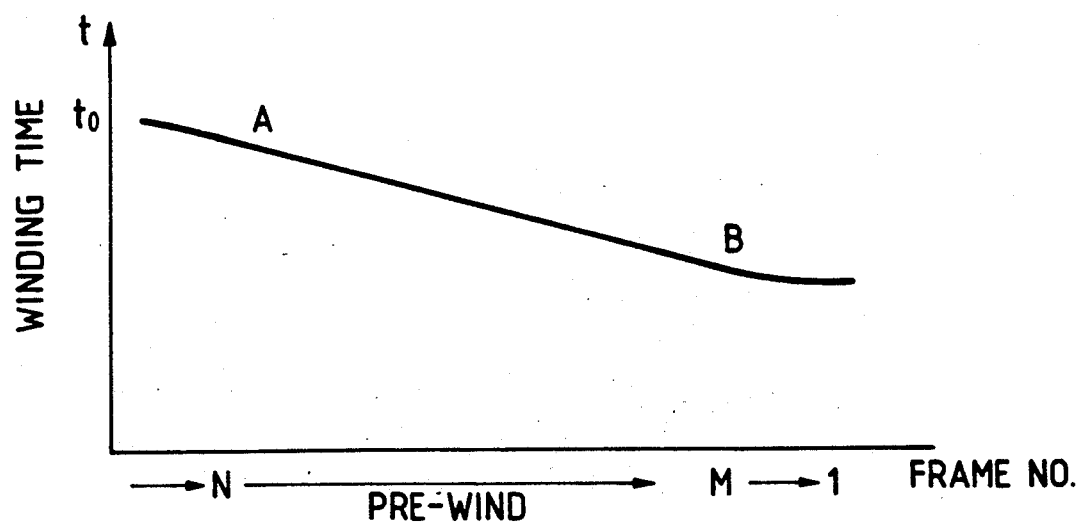
FIG. 5A is a chart showing the film feeding speed as a function of change in spool diameter in a film winding operation.

FIG. 5A is a chart showing the change in the film winding time (or in the film feeding speed) in the pre-winding operation.

As the film is taken up on the film winding spool 7, the film winding time t per frame decreases as shown in FIG. 5A, due to an increase in the film winding speed, resulting from an apparent increase in the spool diameter. However, the film winding speed does not increase in simple proportion to the spool diameter (portion B in FIG. 5A), as the increase in spool diameter results also in an increase in the load.

In the pre-winding system as in the present embodiment, effective information for the film feeding (re-winding) can be obtained by recording the film winding time for all the frames in the course of the pre-winding operation. However correction is possible by predicting the variation in the load resulting from a change in the number of turns of film on the spool.

Figure 5B:
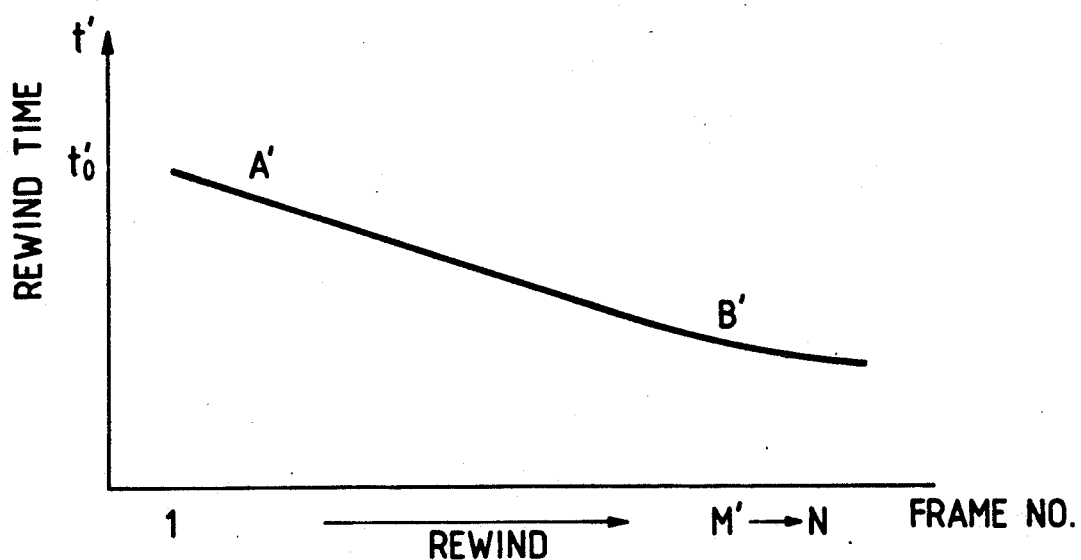
FIG. 5B is a chart showing the film feeding speed as a function of change in spool diameter in a film re-winding operation, predicted from the film feeding speed in FIG. 5A.

FIG. 5B is a chart indicating the time between the frames in the rewinding operation, predicted from the information shown in FIG. 5A.

In the rewinding operation in which the film is wound on the spool in the film cartridge, the rewinding time t' is longer in the beginning and becomes shorter with the increase in the diameter of the spool, with the increase in the number of frames. However, as in the winding operation, the rewinding times does not decrease in proportional manner (portion B') because of the increase in load.

Thus correction becomes possible, by the information shown in FIG. 5A, stored in the pre-winding operation. More specifically, the pattern in FIG. 5B can be predicted from that in FIG. 5A, by determining the ratios of the rotating speed and the diameter of the film winding spool 7 to those of the spool in the film cartridge. In more details, there is at first determined the initial winding speed when the film end is wound on each spool, and the inclination of curve is determined from the rate of apparent change in the spool diameter resulting from the film thickness, utilizing the ratio of spool diameters. Finally the non-linear portion B is corrected by the original data in FIG. 5A. The slope of the portion B may also be predicted and corrected from the prediction of variation in the load, based on the remaining amount and wound amount of the film.

In the following there will be explained an example of the above-explained calculation.

The winding time $t_n$ for each frame number n is given according to FIG. 5A as follows:

$$t_n = t_0 - A(N - n) \qquad N \geq n \geq M \qquad (1)$$
$$t_n = t_0 - A(N - M) - B(M - n) \qquad M \geq n \geq 1$$

wherein N is the total number of frames; M is the frame number where the change in winding time becomes non-linear (A to B); $t_0$ is the initial winding time; A is the inclination between N and M; and B is the inclination between M and 1.

Then, in FIG. 5B, there are given relations:

$$t_0' = D_2/D_1 \times v_2/v_1 \times t_0 \qquad (2)$$
$$A' = A \times D_1/D_2$$
$$B' = B \times D_1/D_2$$

wherein $D_1$ is the diameter of film winding spool 7; $v_1$ is the rotating speed thereof under no load; $D_2$ is the diameter of spool of film cartridge; and $v_2$ is the rotating speed thereof under no load.

Thus the winding time tn' for each frame number n in the rewinding operation is predicted as:

$$t_n' = t_0' - A'(n - 1) \qquad M \geq n \geq 1 \qquad (3)$$
$$t_n' = t_0' - A'(M - 1) - B'(n - M) \qquad N \geq n \geq M$$

In the above-explained approximation, the number of correction terms may be increased in consideration of the kind of film, temperature and power source voltage, and the present embodiment incorporates these factors in the prediction of the film feeding speed since these factors will enable more appropriate recording of information.

It is also effective to incorporate, in said prediction, the actual data such as the characteristics of the film feeding motor and the gear train to be employed in the camera.

Figure 6A:
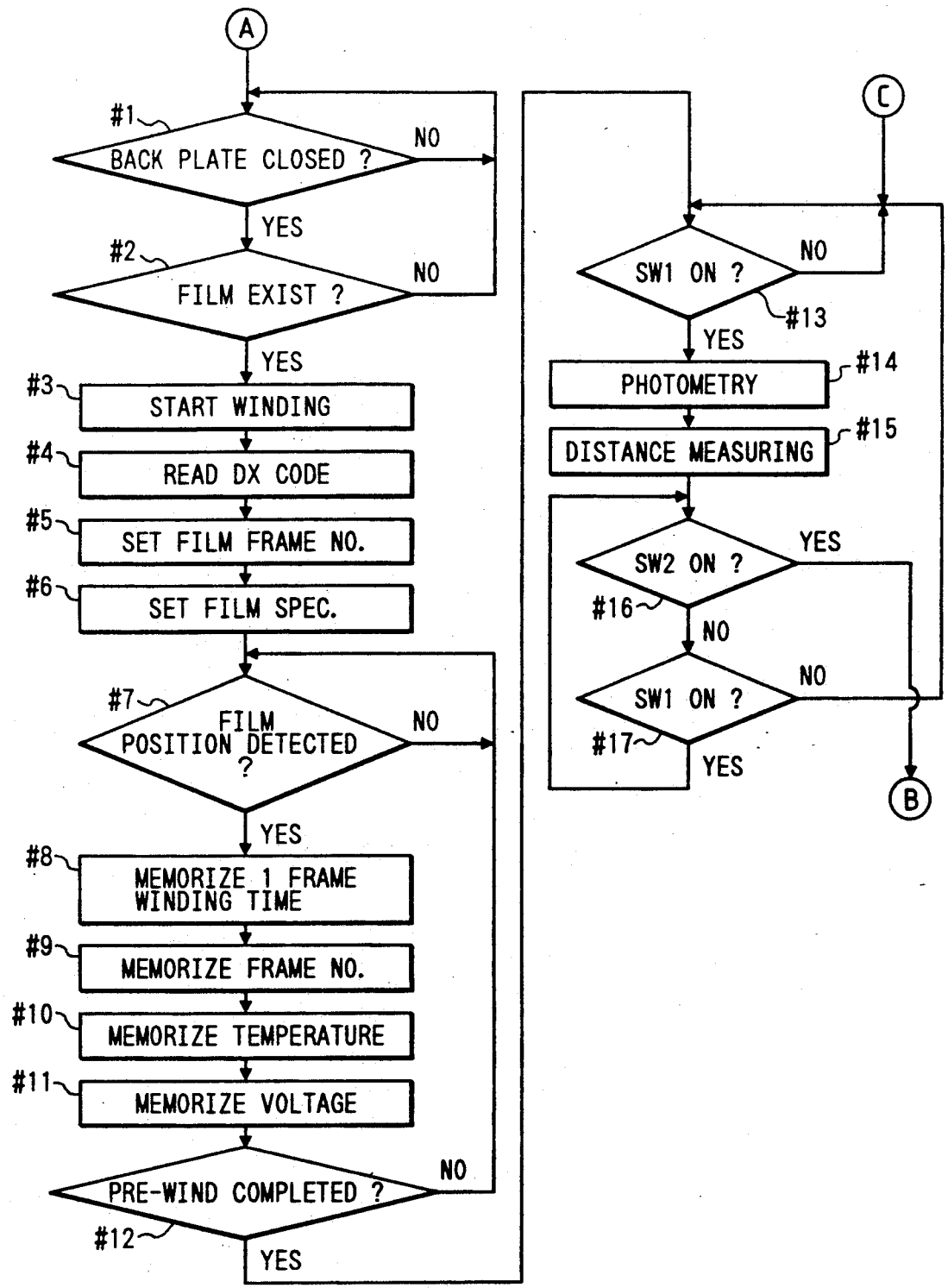
FIGS. 6A and 6B are flow charts showing control sequence of a microcomputer shown in FIG. 4.
Figure 6B:
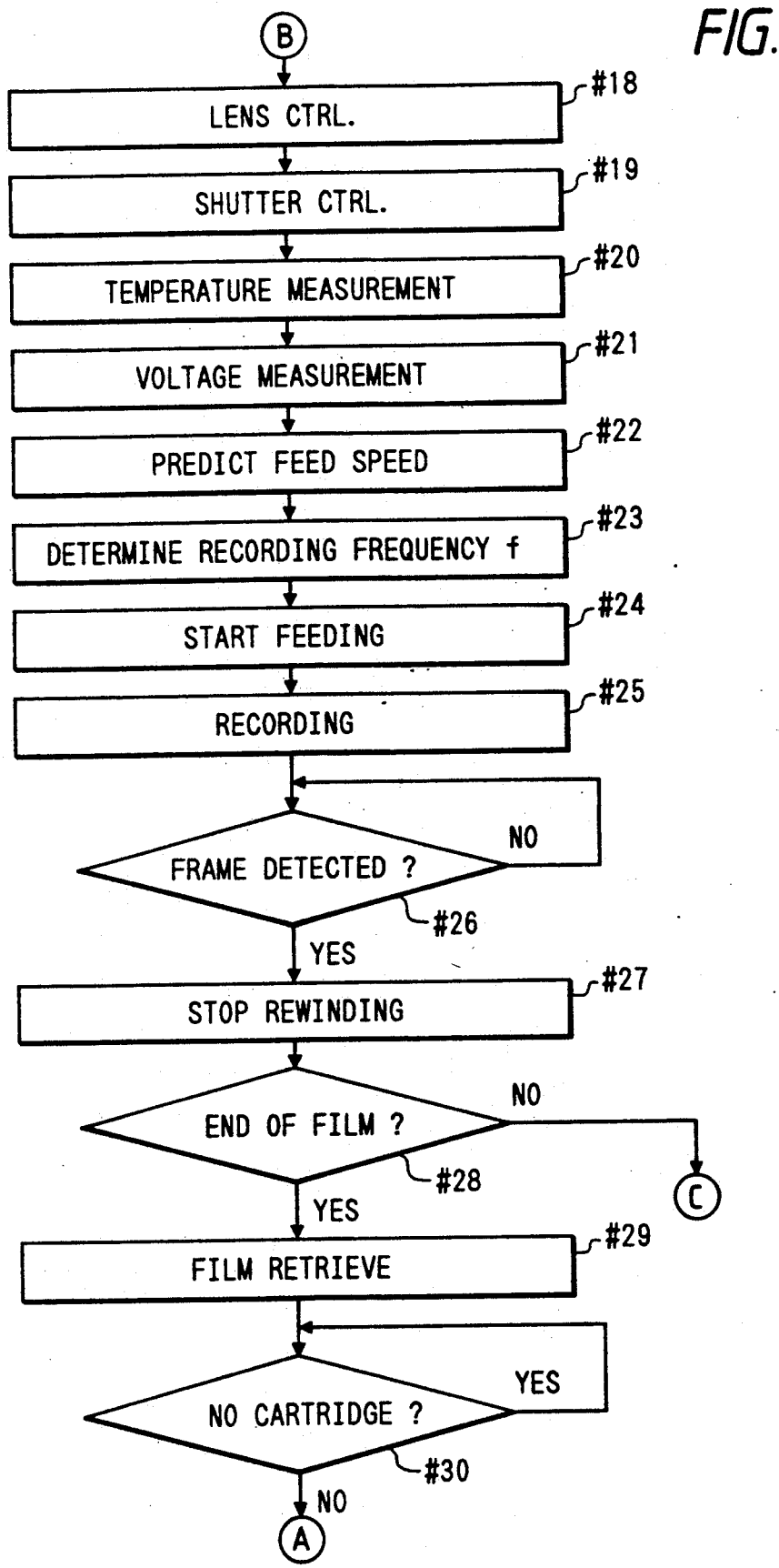

FIGS. 6A and 6B are flow charts showing the control sequence of the microcomputer 53, shown in FIG. 4, capable of prediction explained above.

Step 1: It discriminates, from the state of the rear cover switch 56, whether the rear cover is closed, and, if not closed, the step 1 is repeated. If the rear cover is closed, the sequence proceeds to a step 2.

Step 2: It discriminates, from the state of the switch 57, whether the film cartridge is loaded in the cartridge chamber 3, and, if not loaded, the sequence returns to the step 1. If loaded, the sequence proceeds to a step 3.

Step 3: It rotates the unrepresented film feeding motor in the forward direction through the motor control circuit 59, thereby starting the winding of the film.

Step 4: It drives the DX code reading circuit 58, thereby reading the total number of frames and the kind of film, from the DX code provided on the film cartridge. Said information may be read by the magnetic head 6 from the film, but, in the present embodiment, it is assumed to be read from the DX code provided on the film cartridge.

Step 5: It sets the total frame number N read in the step 4.

Step 6: It sets the kind of film (manufacturer, reversal/negative film, film sensitivity) read in the step 4.

Step 7: It discriminates, by the frame position detecting circuit 6 for detecting the frame position for example by the film perforations, whether a frame has been detected (whether the feeding of a frame has been conducted), and, if not detected, the step 7 is repeated. If detected, the sequence proceeds to a step 8.

Step 8: It reads, from the internal timer, the winding time t required for the winding of a frame (time until the detection of a frame feeding in the steps 3 to 7), based on the timing of frame position detection in the step 7, and stores said time in the RAM of the microcomputer 53. This step also detects the change in said time t for the frames, thereby discriminating whether said change has become non-linear, namely whether the state M in FIG. 5A has been reached.

Step 9: It stores the frame number in the RAM, in relation to the corresponding winding time mentioned time. Thus the winding time $t_n$ of the aforementioned equations is stored in relation to the frame number n. Also a frame number n, where the state M in FIG. 5A is reached, is memorized as M.

In the present embodiment there is assumed a camera of pre-winding system as already explained before, but the present invention is likewise effective in a camera not employing such system (a camera of normal winding system), as will be explained in the following. In such case, data during the initial film feeding operation are stored as a winding time corresponding to a frame and will be used in the prediction of the film feeding speed for each frame after phototaking operation.

Step 10: Temperature in the camera is measured by a temperature detection circuit 64, and is stored in the RAM.

Step 11: Power source voltage is measured by a voltage detection circuit 65, and is stored in the RAM.

Step 12: It discriminates whether the prewinding operation has been conducted to the frame number set in the step 5, and, if not, the sequence returns to the step 7 to repeat the above-explained sequence, with determination of $t_n$ for each frame number. If the pre-winding operation is complete, the sequence proceeds to a step 13.

Step 13: The sequence enters a stand-by state for the actuation of the switch SW1, and the sequence proceeds to a step 14 when said switch is turned on.

Step 14: The photometry circuit 51 is activated, and the obtained object luminance information is entered.

Step 15: The distance measuring circuit 52 is activated, and the obtained object distance information is entered.

Step 16: It discriminates the state of the switch SW2, and the sequence proceeds to a step 18 in FIG. 6B or to a step 17 respectively if said switch is on or off.

Step 17: It discriminates the state of the switch SW1 again, and the sequence returns to the step 16 or 13, respectively if said switch is on or off.

Step 18: It controls the lens control circuit 61 based on the object distance information obtained in the step 15, thereby focusing the phototaking lens.

Step 19: It controls the shutter control circuit 60 based on the object luminance information obtained in the step 14, thereby effecting exposure of the film.

Step 20: It activates the temperature detection circuit 64 in order to know the current temperature in the camera, and enters the obtained temperature information.

Step 21: It activates the voltage detection circuit 65 in order to know the current state of power supply voltage, and enters the obtained voltage information.

Step 22: It predicts the feeding speed of the photographed frame, based on the frame winding time $t_n$ obtained in the step 8 corresponding to each frame number n and the frame numbers n, M obtained in the step 9, for determining the inclinations and the initial winding time in the predicting equations explained in relation to FIG. 5B, and also in consideration of the total frame number N obtained in the step 5, the kind of film obtained in the step 6, temperature obtained in the step 10, power source voltage obtained in the step 11, temperature obtained in the step 20 and power source voltage obtained in the step 21. More specifically, A and B are determined from $t_n$, n, N and M according to the equations (1), and $t_n'$ corresponding to the frame number n is determined by the equations (2) and (3). The parameters $D_1$, $D_2$, $v_1$ and $v_2$ in the equations (2) are stored in advance.

Step 23: It determines the recording frequency f for information recording in the magnetic memory area, based on the result of said step 22.

Step 24: It rotates the film feeding motor through the motor control circuit 59 in the reverse direction, with a feeding speed determined by said prediction, thereby starting the rewinding operation of the film.

Step 25: It activates the magnetic head 6, through the head control circuit 62, with the frequency f determined in the step 23, thereby recording the aforementioned photographing information in the magnetic memory area of the film in feeding.

Step 26: It discriminates whether the frame position detection circuit 63 has detected a frame position, and, upon detection, the sequence proceeds to a step 27.

Step 27: It inhibits the operation of the film feeding motor through the motor control circuit 59, thereby terminating the rewinding of the film.

Step 28: It discriminates whether all the frames have been photographed, based on the current frame number and the number of frames set in the step 5, and, if not, the sequence returns to the step 13 to repeat the above-explained sequence. If all the frames have been photographed, the sequence proceeds to a step 29.

Step 29: It reverses the film feeding motor through the motor control circuit 59, thereby rewinding all the film into the film cartridge.

Step 30: It discriminates, from the state of the switch 57, whether the film cartridge is present or absent in the cartridge chamber 3, and, if absent, the sequence returns to the step 1 in FIG. 6A.

Figure 7:
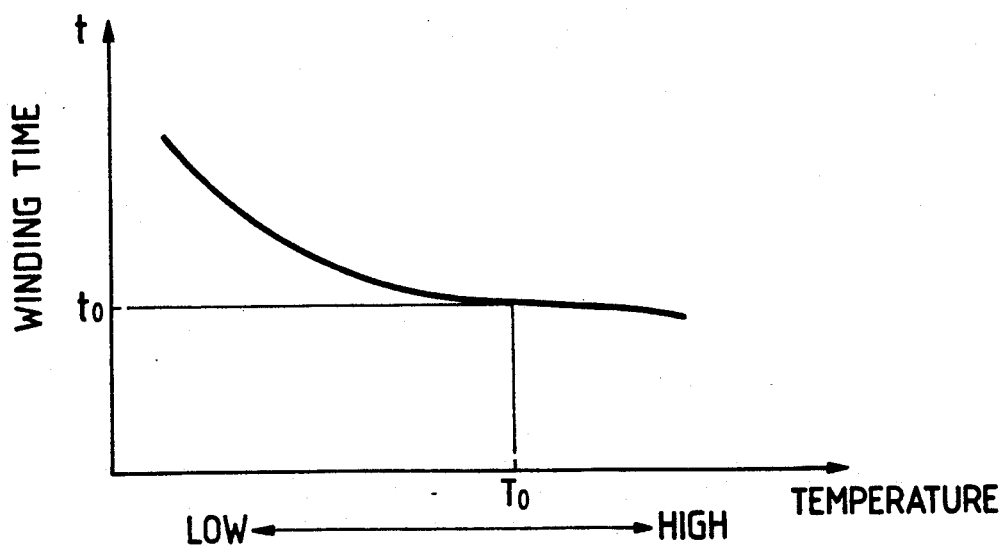
FIG. 7 is a chart showing relation between film winding time and temperature.

FIG. 7 shows an example of the change in winding time as a function of temperature.

The winding time tends to become shorter with the increase in temperature, because of a decrease in the film winding load, a decrease in the friction of gear train, an improved efficiency in the battery etc. The step 22 predicts the feeding speed at other temperatures by the ratio in which the feeding speed at normal temperature is taken as "1".

Figure 8:
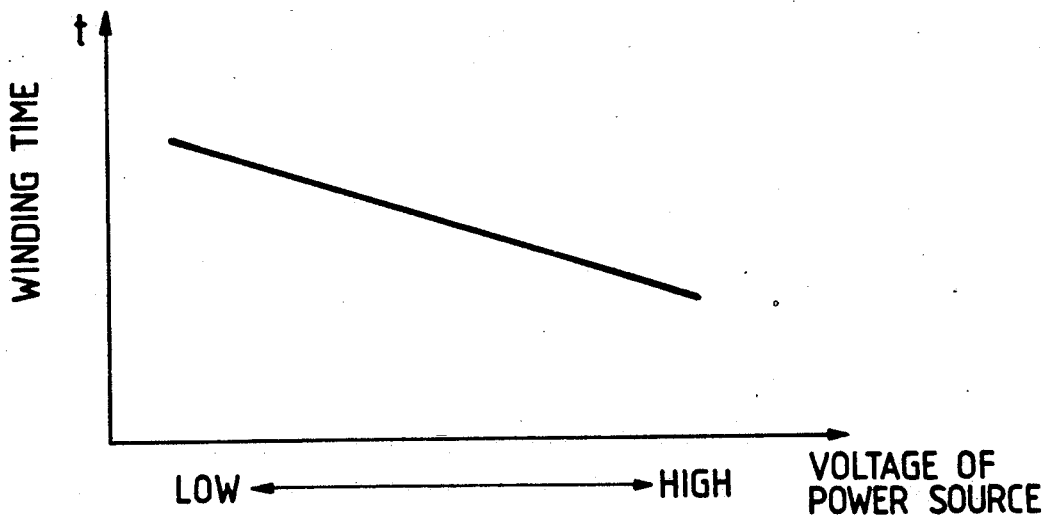
FIG. 8 is a chart showing relation between film winding time and power source voltage.

FIG. 8 shows the change in the winding time t as a function of the power source voltage.

As already known, a higher power source voltage elevates the revolution of the film feeding motor, thereby reducing the winding time t. In addition to a correction based on this fact, the step 22 effects a correction based on a fact that the camera of the present embodiment, based on the pre-winding system, involves continuous electric power consumption in the film winding operation, thus resulting in a voltage drop with the progress of the film winding, whereas, in the normal winding system, the power source voltage shows recovery after phototaking of each frame.

Figure 9:
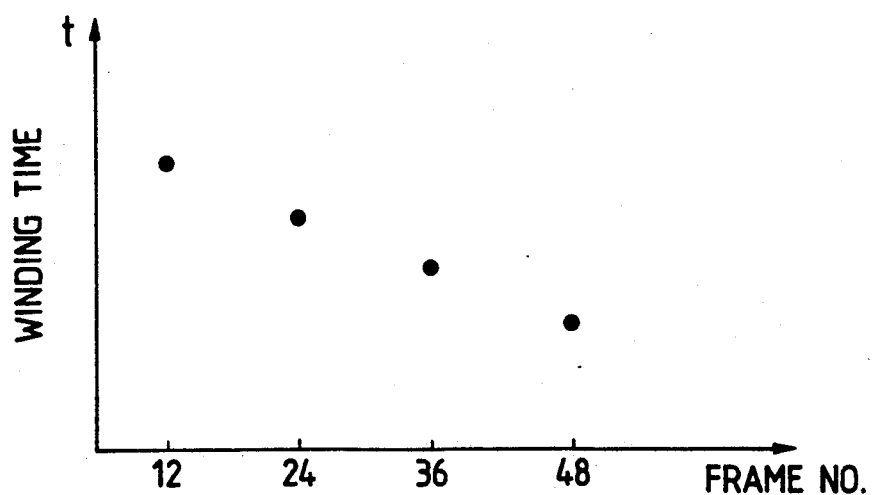
FIG. 9 is a chart showing relation between an average film winding time and different numbers of image frames on a film.

FIG. 9 is the plotting of average winding time, as a function of the total number of frames.

The number of frames on the film has little influence when the data are stored for all the frames in the prewinding system as shown in FIG. 5A, but said number of frames may be effectively used as a correction term in the step 22 for enabling more precise prediction of the feeding speed, in case of the prewinding system without storage of data for each frame or of the normal winding system, in consideration of the increase in load with the progress of film winding and the increase in the force required for film extraction when the cartridge is fully filled with the film. Also the number of frames becomes indispensable for predicting the feeding speed in case the spool diameter in the film cartridge varied with the number of frames, for example 12 frames and 24 frames, on a film.

Also in the present embodiment, the variation in load, resulting from the wound amound and remaining amount of film is taken as a correction term. Because the relationship between said amounts is dependent on the total number of frames, said number is an important parameter.

Figure 10:
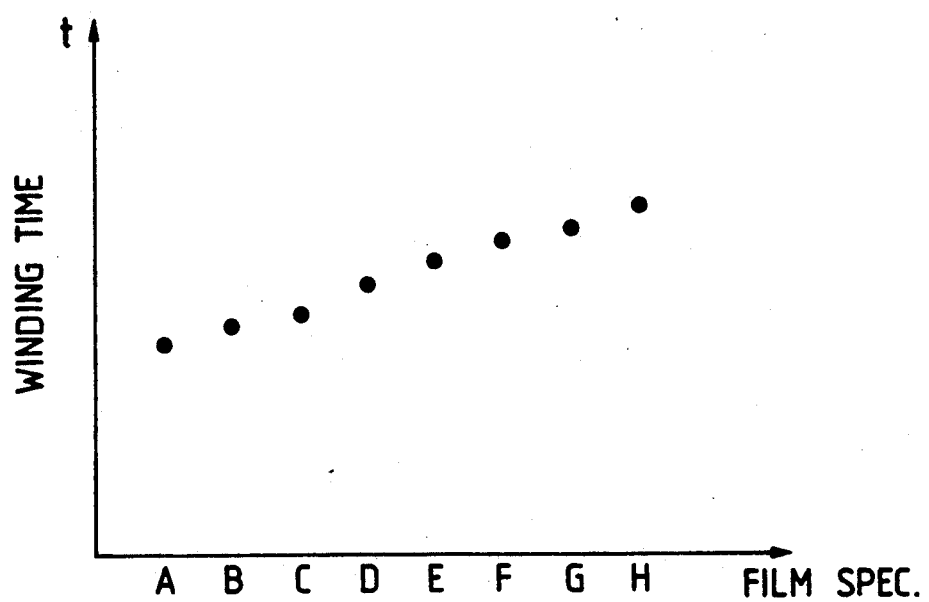
FIG. 10 is a chart showing relation between film winding time and different kinds of film.

FIG. 10 shows the plotting of average winding time, as a function of kinds A-H of the film, classified for example by the manufacturer, reversal/negative type, film sensitivity etc.

Such information on representative films, if provided in the camera, will enable prediction of feeding speeds corresponding to various films. The step 22 employs said information on the film kinds, in consideration of the above-mentioned fact.

Also there is enabled correction for the different temperature-dependent variations according to the kinds of film. Thus, correction can be made for a parameter other than the apparent change in the spool diameter.

FIG. 11 is a flow chart showing the function of principal components in another embodiment of the present invention, constituting a modification in the steps 20 to 25 in the foregoing embodiment, shown in FIG. 6B. Same step numbers as in FIG. 6B indicate same operations, so that such steps will not be explained further.

After the step 20, the sequence proceeds to a step 24 for starting the film rewinding, then a step 21 for measuring the power source voltage, and a step 31 for discriminating whether the power source voltage measured in the step 21 has become substantially stable. If not, the sequence returns to the step 21 for repeating the measurement of the power source voltage. On the other hand, if the step 31 identifies that the power source voltage is constant, the sequence proceeds to the step 22 for predicting the film feeding speed as explained before, then the step 23 for determining the writing frequency f for information recording by the magnetic head 6 based on the above-mentioned information, and the step 25 for initiating the information recording by driving the magnetic head 6.

Figure 12:
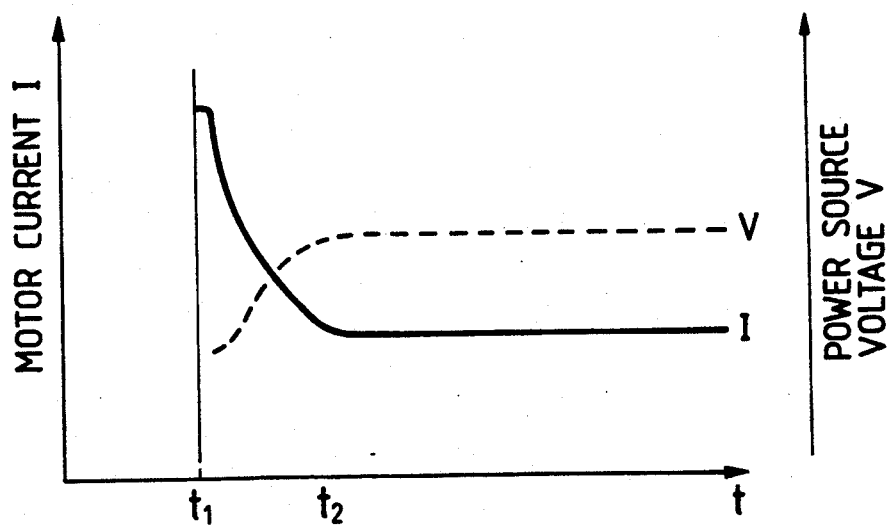
FIG. 12 is a chart explaining said functions.

FIG. 12 is a chart for explaining the discrimination conducted in the step 31 in FIG. 11.

The information recording in the step 25 in FIG. 6B has to be conducted under a motor current after a time $t_2$, because, in a period $t_1-t_2$, a large current is supplied to the film feeding motor for starting up said motor whereby the power source voltage is significantly lowered. The discrimination in the step 31 is conducted to distinguish the proper timing.

FIG. 13 is a flow chart showing the functions of principal components in another embodiment, which stores the actual feeding time, temperature, power source voltage and frame number in relation to the predicted feeding time, in order to correct the feeding time (feeding speed) for the next image frame. For this purpose a modification is made between the steps 27 and 28 shown in FIG. 6B in the foregoing embodiment. Steps of same numbers as in FIG. 6B are same as those in FIG. 6B and will not, therefore, be explained further.

After the film rewinding is terminated in the step 27, a step 27-1 memorizes the time required for the actual rewinding. Then a step 27-2 memorizes the power source voltage, temperature and frame number. A next step 27-3 determines the difference between the feeding time predicted in the step 22 and the actual feeding time memorized in the step 27-1, and determines and memorizes a correction value for the feeding speed to be predicted in the step 22 for the next image frame, also in consideration of the information memorized in the step 27-2.

Figure 14:
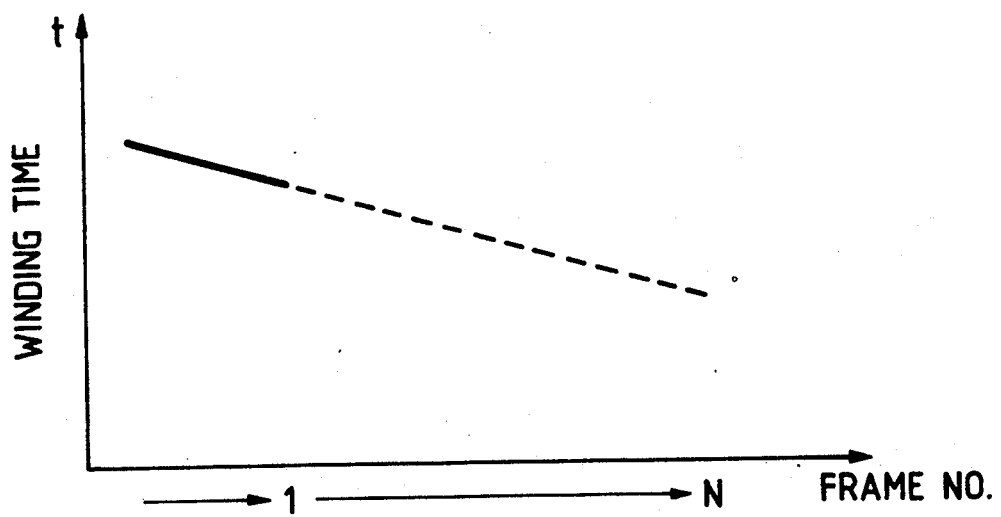
FIG. 14 is a chart showing the film feeding speed as a function of change in spool diameter in still another embodiment of the present invention.
Figure 15:
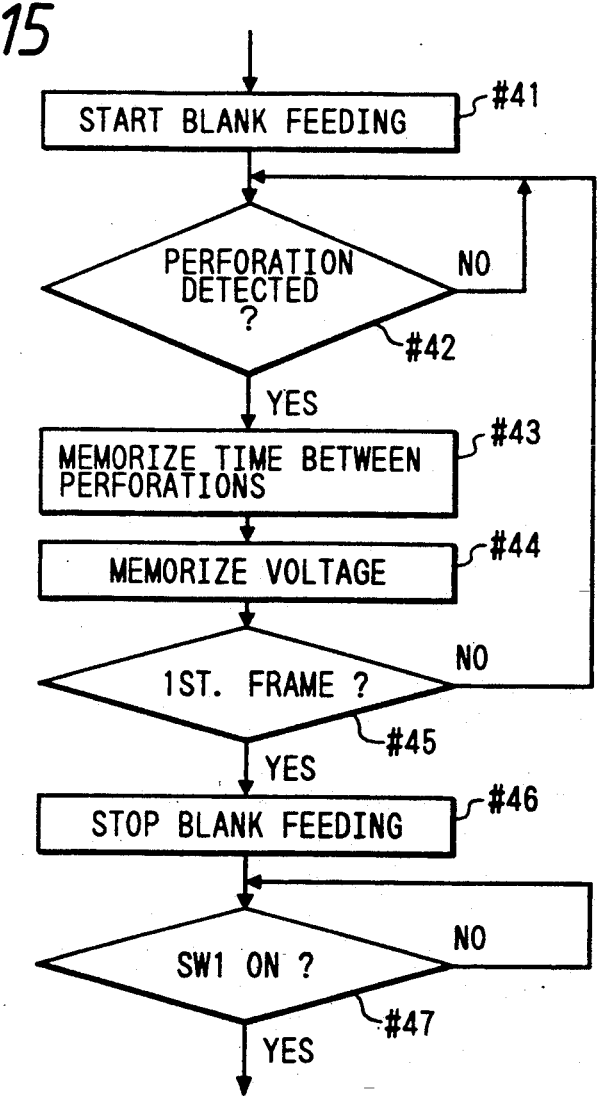
FIG. 15 is a flow chart showing function of principal units in said embodiment.

FIGS. 14 and 15 show still another embodiment of the present invention, which is applied to a camera of normal winding system in which the film is wound after each phototaking operation, instead of the pre-winding system explained before.

In the normal winding system, the winding time between the frames in the initial blank film feeding as shown in FIG. 14 is utilized for predicting the winding time (feeding speed) after phototaking operation, dependent on the variation in the diameter of the film winding spool 7. In this case, the correction for the latter portion B' in FIG. 5B may be conducted by the number of image frames, kind of film etc.

FIG. 15 is a main flow chart relating to the fetching of various information shown in FIG. 14.

At first a step 41 initiates the blank film feeding, then a next step 42 detects the frame position by the detection of perforations, and, upon identification of the frame position, a step 43 memorizes the winding time between the frames. Also a step 44 memorizes the power source voltage. Then a step 45 discriminates whether the blank film feeding to the first frame has been completed, and, if not, the sequence returns to the step 42, but, if completed, the sequence proceeds to a step 46 for terminating the blank feeding operation. The sequence then proceeds to a step 47 for awaiting the turning-on of the switch SW1.

As explained in the foregoing embodiment, in the camera of pre-winding system, the film feeding speed of a photographed frame is predicted from the winding time for said frame ih the pre-winding operation and the memorized diameters of the film winding spool and the spool in the film cartridge as shown in FIGS. 5A and 5B, while, in the camera of normal winding system, the film feeding speed for said photographed frame is predicted from the winding time of frames in the blank film winding operation, and the film feeding is conducted according to thus predicted feeding speed. Consequently the information recording in the magnetic memory area provided on the film can be made with a high density and within a predetermined area. Thus the encoder for detecting the moving amount of film can be dispensed with, and there can be achieved cost reduction and structural simplification of the camera.

Also as the film feeding speed determined by said prediction is further corrected by the total number of frames, kind of film, temperature, power source voltage etc., there can be achieved highly precise preduction depending not only on the apparent change in spool diameters but also on the variation in the film extracting force.

Figure 16:
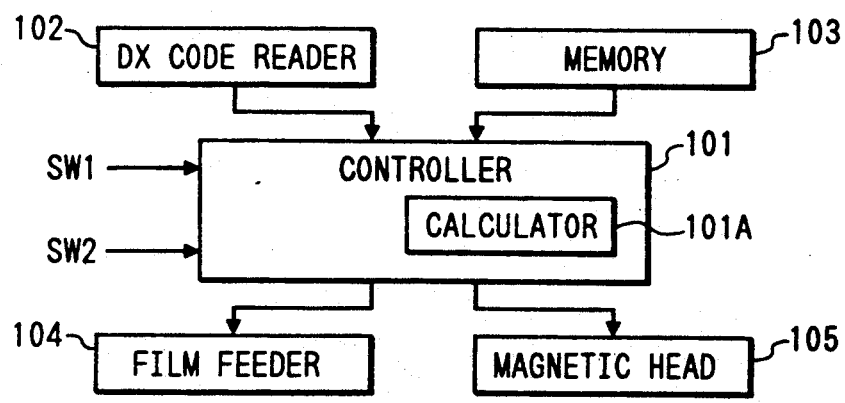
FIG. 16 is a block diagram of a camera constituting still another embodiment of the present invention.

FIG. 16 is a schematic block diagram of another embodiment, of which functions will be explained in the following with reference to a flow chart shown in FIG. 17. In the present embodiment there is assumed a camera of so-called pre-winding type, in which all the film is wound in the beginning and is re-wound frame by frame at each phototaking operation.

At first a controller 101 discriminates, in a step 201, whether a rear cover has been closed, and, if in a closed state indicating that a film cartridge hasd been loaded, drives film feeding means 104 in a step 202 thereby starting the winding of a film provided thereon with magnetic memory areas. A next step 203 activates the DX code reading means 102 to read the kind of film, such as manufacturer, reversal/negative type, film sensitivity etc. from the DX code, and a next step 204 sets said kind of film. A next step 205 discriminates whether all the image frames of the film have been wound, namely whether the prewinding operation has been completed, and, if not, the above-explained operations are similarly repeated. However the steps 202, 203 need not be conducted every time but can be conducted at such frequency as not to cause error. Upon confirmation of completion of the pre-winding operation, the sequence proceeds to a step 206.

The step 206 discriminates the state of a switch SW1 to be turned on by the depression of a shutter release button over a first stroke, and, if turned on, steps 207, 208 activate unrepresented photometry means and distance measuring means to obtain information on measured light and distance. Then a step 209 discriminates the state of a switch SW2 to be turned on by the depression of said shutter release button over a second stroke, and, if turned on, a step 210 effects lens control and shutter control in known manner, thereby conducting a focusing operation and an exposure to the film.

In a next step 211, a calculation means 101A in the controller 101 reads the correction value for film feeding speed, resulting from the film extraction or rewinding corresponding to the film kind stored in advance in the memory 103, and predicts the film feeding speed (more precisely the rewinding speed since the pre-winding system is adopted in the present embodiment) of the photographed frame, based on said correction value.

In a next step 212, the controller 101 instructs the film feeding means 104 to effect film feeding according to said predicted feeding speed. Then a step 213 drives a magnetic head 105 to record various photographing information such as shutter time, diaphragm aperture, photographing date, comment etc. in the magnetic memory area of the film fed as explained above, with a recording frequency determined from the film feeding speed mentioned above.

A next step 214 discriminates whether the feeding of said photographed frame has been completed, and, if completed, a step 215 instructs the termination of film feeding to the film feeding means 104. Then a step 216 discriminates whether the film has come to the end, namely whether all the frames have been photographed, and, if not, the sequence returns to the step 206 to repeat the above-explained sequence. If all the frames have been photographed, there is initiated, as already known, as operation of rewinding the entire film into the film cartridge.

As explained in the foregoing, the film feeding speed after phototaking operation is predicted by identifying the kind of film to be used and selecting a correction value for the film feeding speed from memory means corresponding to said kind of film, so that the information recording can be made within a proper area without the use of an expensive and complex encoder.

Figure 17:
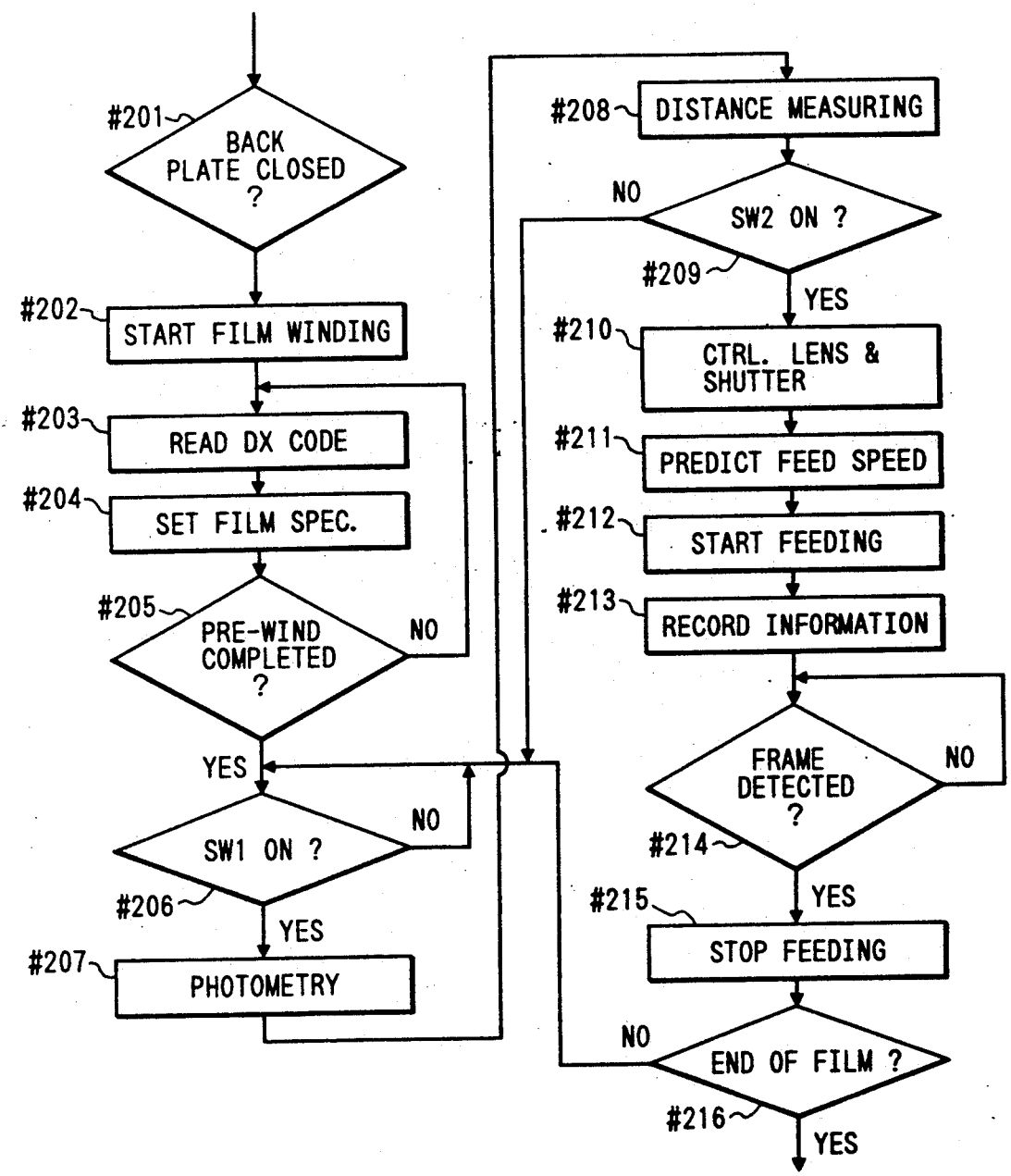
FIG. 17 is a flow chart of control sequence in the embodiment shown in FIG. 16.

For realizing the process flow shown in FIG. 17, there can be employed the camera circuit shown in FIG. 4, in which the RAM provided in the microcomputer 53 stores the correction values for the film feeding speed, corresponding to the different kinds of film. In the details of the process flow shown in FIG. 17, there are employed and executed the flows shown in FIGS. 6A and 6B.

The step 22 in FIG. 6 effects prediction by reading, from the RAM, the correction value corresponding to the kind of film, read in the step 6.

Said correction values in the RAM correspond to the differences of the average winding times t shown in FIG. 10, for example in the form of ratios to a reference value, and the correction is made by multiplying $t_n'$, obtained by the above-explained prediction in the step 22, by the correction value read according to the kind of film.

Figure 18:
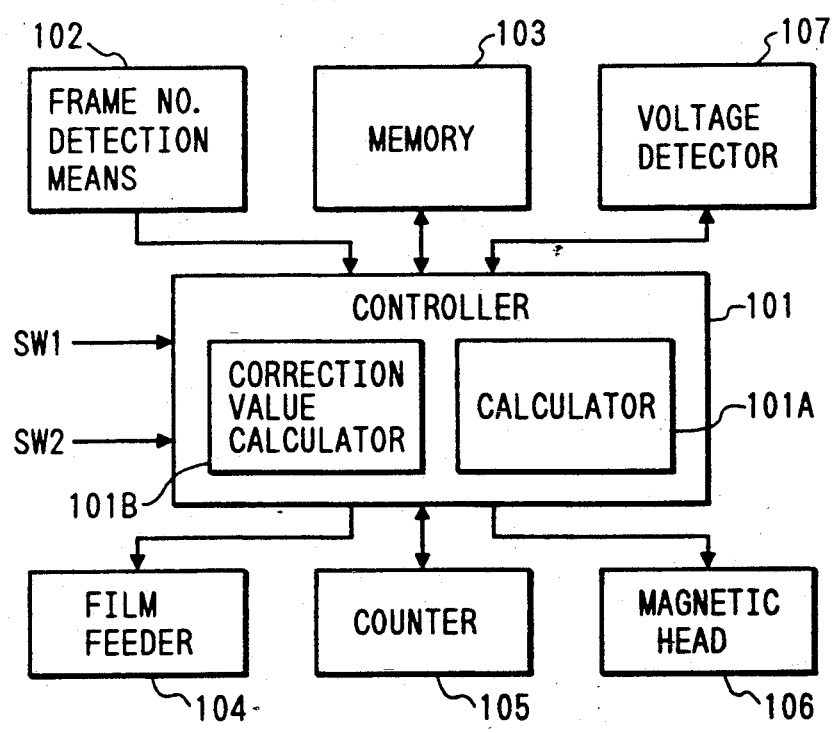
FIG. 18 is a block diagram of a camera constituting still another embodiment of the present invention.

FIG. 18 is a schematic block diagram of another embodiment of the present invention, of which functions will be explained in the following with reference to a flow chart shown in FIG. 19. In the present embodiment there is assumed a camera of so-called pre-winding system, in which all the film is wound in the beginning and is re-wound frame by frame, at each phototaking operation.

At first a controller 101 discriminates, in a step 201, whether a rear cover has been closed, and, if in a closed state indicating that a film cartridge has been loaded, drives film feeding means in a step 202 thereby starting the winding of a film provided thereon with magnetic memory areas. Subsequent steps 203, 204 detect the current frame number and the time required for film winding of a frame, by means of frame number detection means 102 for detecting the frame number utilizing an unrepresented frame position detector, and counter means 105, and store the obtained information in a memory 103. A next step 205 discriminates whether all the image frames of the film have been wound, namely whether the pre-winding operation has been completed, and, if not, the above-explained operations are repeated. Upon confirmation of completion of the pre-winding operation, the sequence proceeds to a step 206.

The step 206 discriminates the state of a switch SW1 to be turned on by the depression of a shutter release button over a first stroke, and, if turned on, steps 207, 208 activate unrepresented photometry means and distance measuring means to obtain information on measured light and distance. Then a step 209 discriminates the state of a switch SW2 to be turned on by the depression of said shutter release button over a second stroke, and, if turned on, a step 210 effects lens control and shutter control in known manner, thereby conducting a focusing operation an exposure of the film.

In a next step 211, calculation means 101A in the controller 101 detects the current image frame number, based on the information from frame number detection means 102, and predicts the film feeding speed (more exactly film rewinding speed, as the prewinding method is adopted in the present embodiment) for said image frame number. As will be explained later in more details, the calculation means 101A predicts the film feeding speed for the photographed frame, according to the information stored in the memory 103 in the aforementioned steps 203, 204 and power source voltage information to be explained later.

A next step 212 instructs the calculation means 101A to correct the film feeding time, predicted in the step 211, with a correction value calculated by correction value calculation means 101B in a step 220 after the feeding of a preceding photographed frame. For the initial several frames, the correction value is taken as "0" since the correction value is not present or unreliable for such frames. A step 213 determines the recording frequency based on thus corrected feeding time. For the initial several frames, a relatively high recording frequency is selected for ensuring secure recording, because of the above-explained reason. A next 214 instructs the film feeding means 104 to effect film feeding according to said corrected feeding time. A step 215 then activates the magnetic head 106, thereby recording various photographing information, such as the shutter time, diaphragm aperture, phototaking date, comment etc. into the magnetic memory area of the film. A next step 216 discriminates whether the feeding of the photographed frame has been completed, and, if completed, a step 217 instructs the film feeding means 104 to terminate the film feeding operation.

Then a step 218 stores the count of counter means 105 which counts the time from the start of feeding of said photographed frame to the end thereof, namely the actual time required for feeding of said photographed frame, in the memory 103. A step 219 activates a voltage detector 107 to obtain information on the current power source voltage, and stores said information in the memory 103. A next step 220 causes the correction value calculation means 101B to calculate a correction value for the feeding time predicted for the next frame, based on the predicted feeding time obtained in the step 211 and the actual feeding time and the power source voltage information stored in the steps 218 and 219, and stores said correction value in the memory 103.

A next step 221 discriminates whether the film has come to the end, namely whether all the frames have been photographed, and, if not, the sequence returns to the step 206 for repeating the above-explained sequence. On the other hand, if all the frames have been exposed, there is initiated, as already known, an operation of rewinding all the film into the film cartridge.

As explained in the foregoing, the feeding time predicted for the next frame from the winding time information for different frames stored in the memory in the film winding operation is corrected, based on the difference between the predicted feeding time for the frame which has just been exposed and the actual feeding time for said exposed frame which has been fed with said predicted feeding time, and on the current power source voltage. It is therefore rendered possible to effect high-density information recording within a predetermined area, without expensive and complex encoder.

Figure 19:
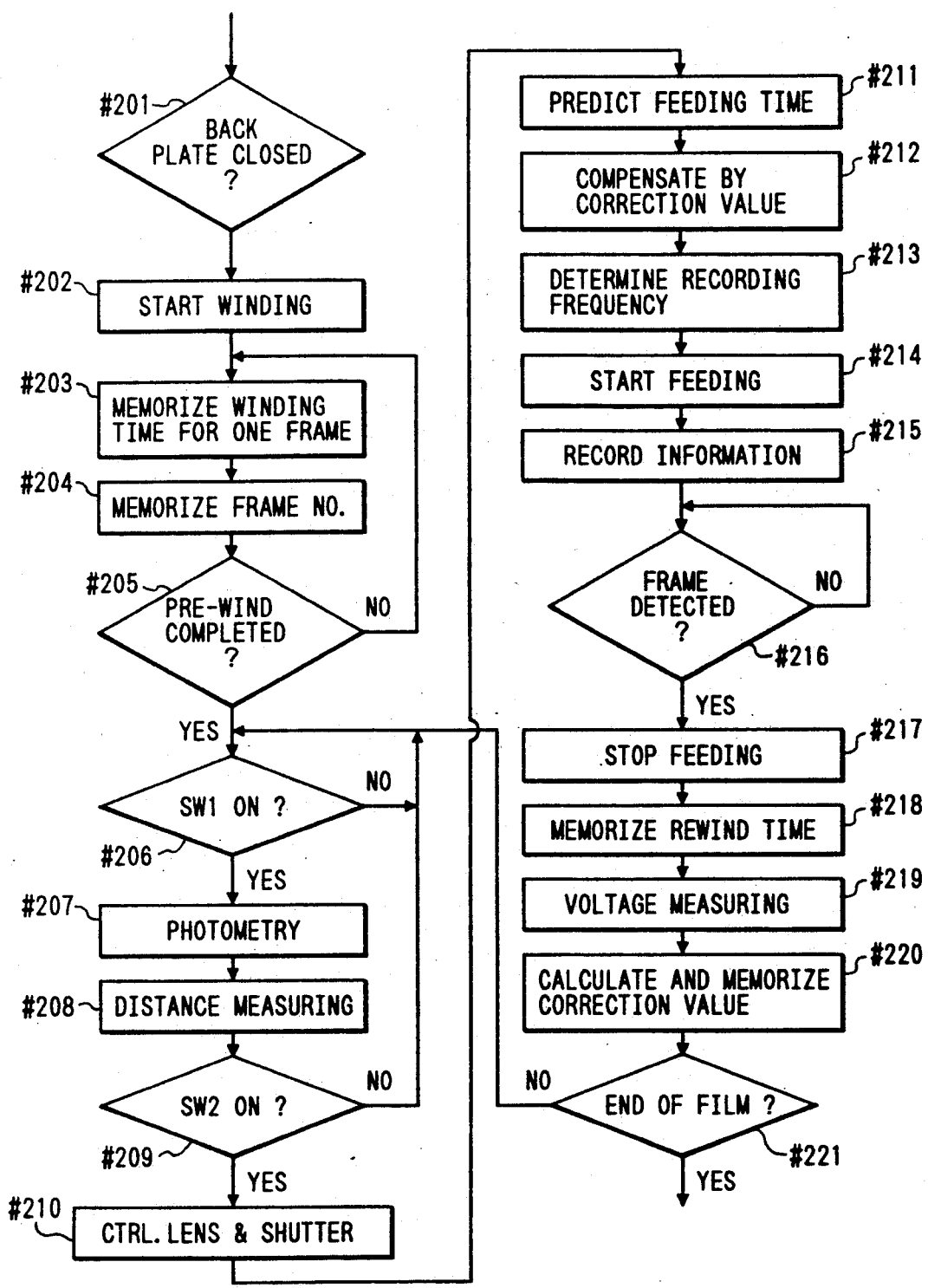
FIG. 19 is a flow chart of control sequence in the embodiment shown in FIG. 18.
Figure 20A:
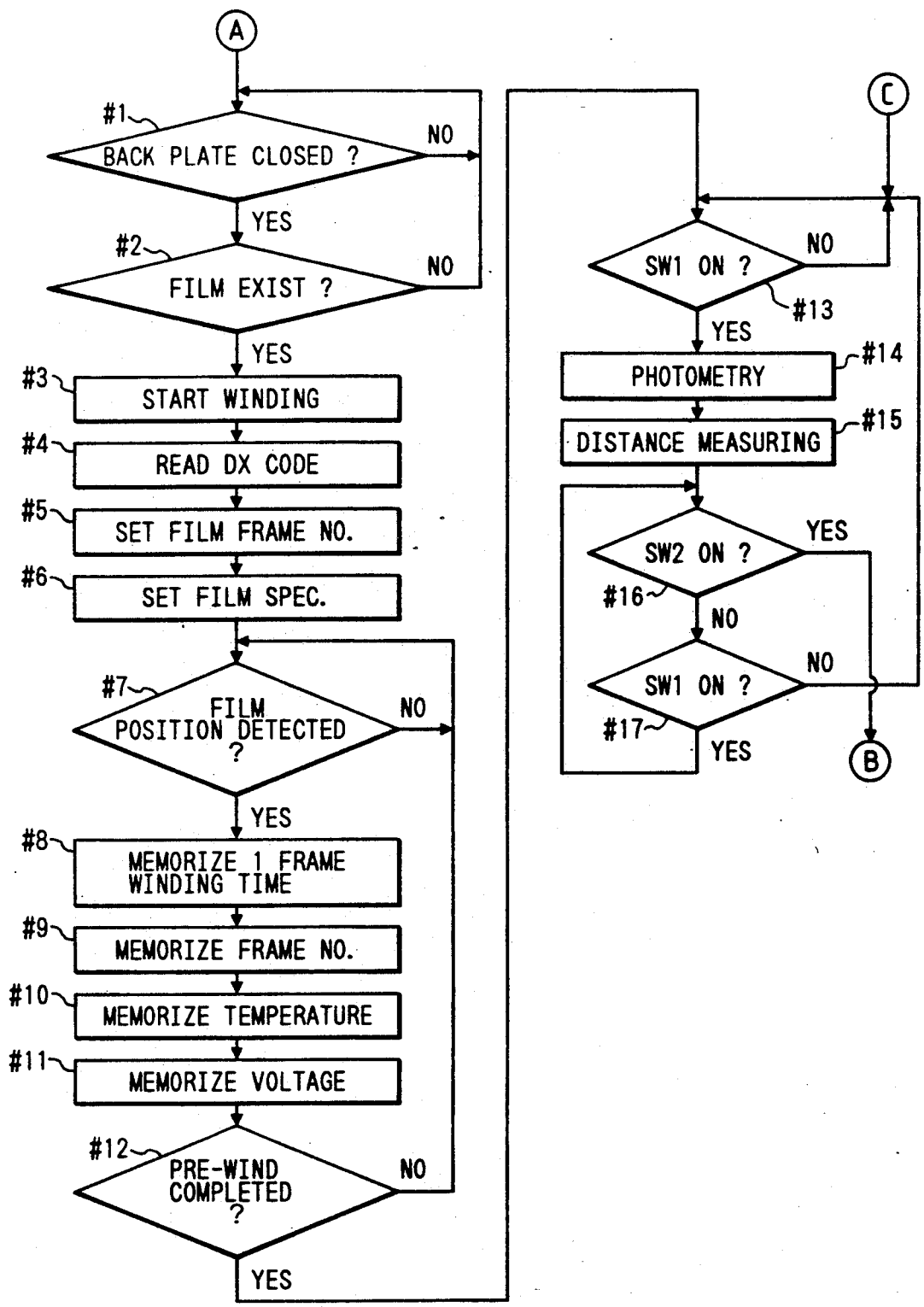
FIGS. 20A and 20B are flow charts showing details of the flow in FIG. 19.
Figure 20B:
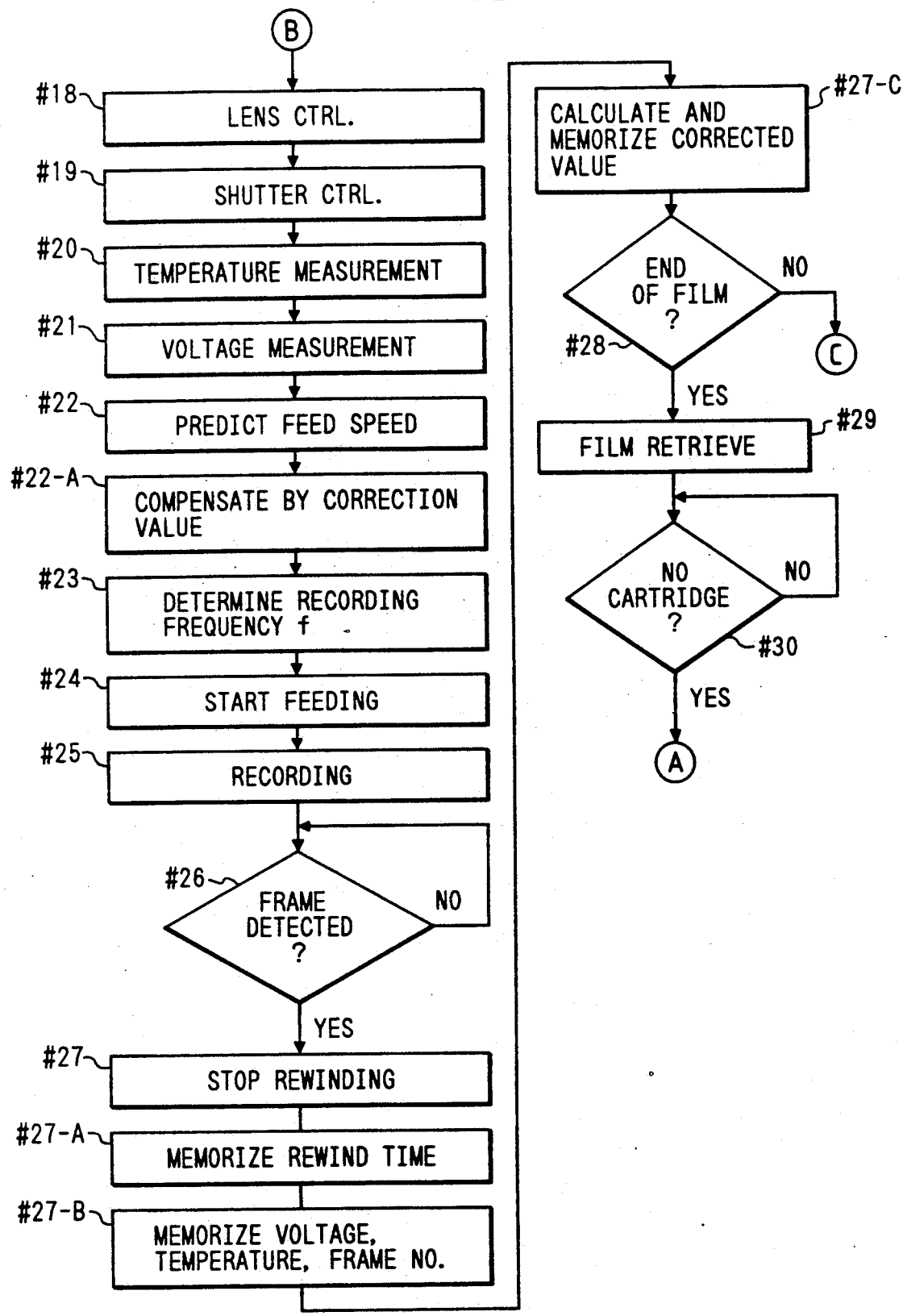

FIGS. 20A and 20B show the details of the flow chart shown in FIG. 19. The process flow shown in FIGS. 20A and 20B will not be explained in detail as it is similar to that shown in FIGS. 6A and 6B, but it is different from the latter in the presence of a correction step 22-A between the steps 22 and 23, and of steps 27-A to 27-C, which will be explained in the following, between the steps 27 and 28. In the following explanation will be given on these different steps only:

Step 22-A: It corrects the preducted feeding time with a correction value memorized in a step 27-C to be explained later. For the initial several frames, said correction value is taken as "0" for the aforementioned reason;

Step 27-A: It memorizes the actual time required for the rewinding of the photographed frame, by storing the count of the time of execution of the steps 24 to 27;

Step 27-B: It memorizes the current power source voltage, temperature and frame number;

Step 27-C: It analyzes the difference between the feeding time predicted in the step 22 and the actual feeding time stored in the step 27-A, determines the correction value for the feeding time predicted for the next frame in the step 22, in consideration of the information obtained in the step 27-B, and memorizes said correction value.

Figure 21:
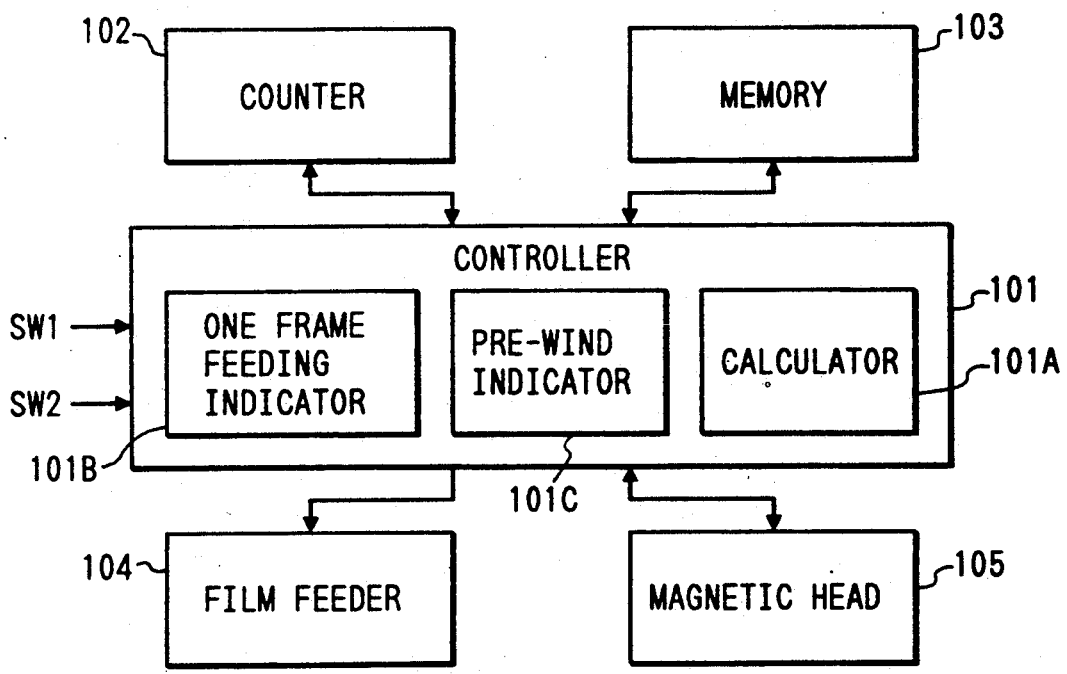
FIG. 21 is a block diagram of a camera constituting still another embodiment of the present invention.
Figure 22:
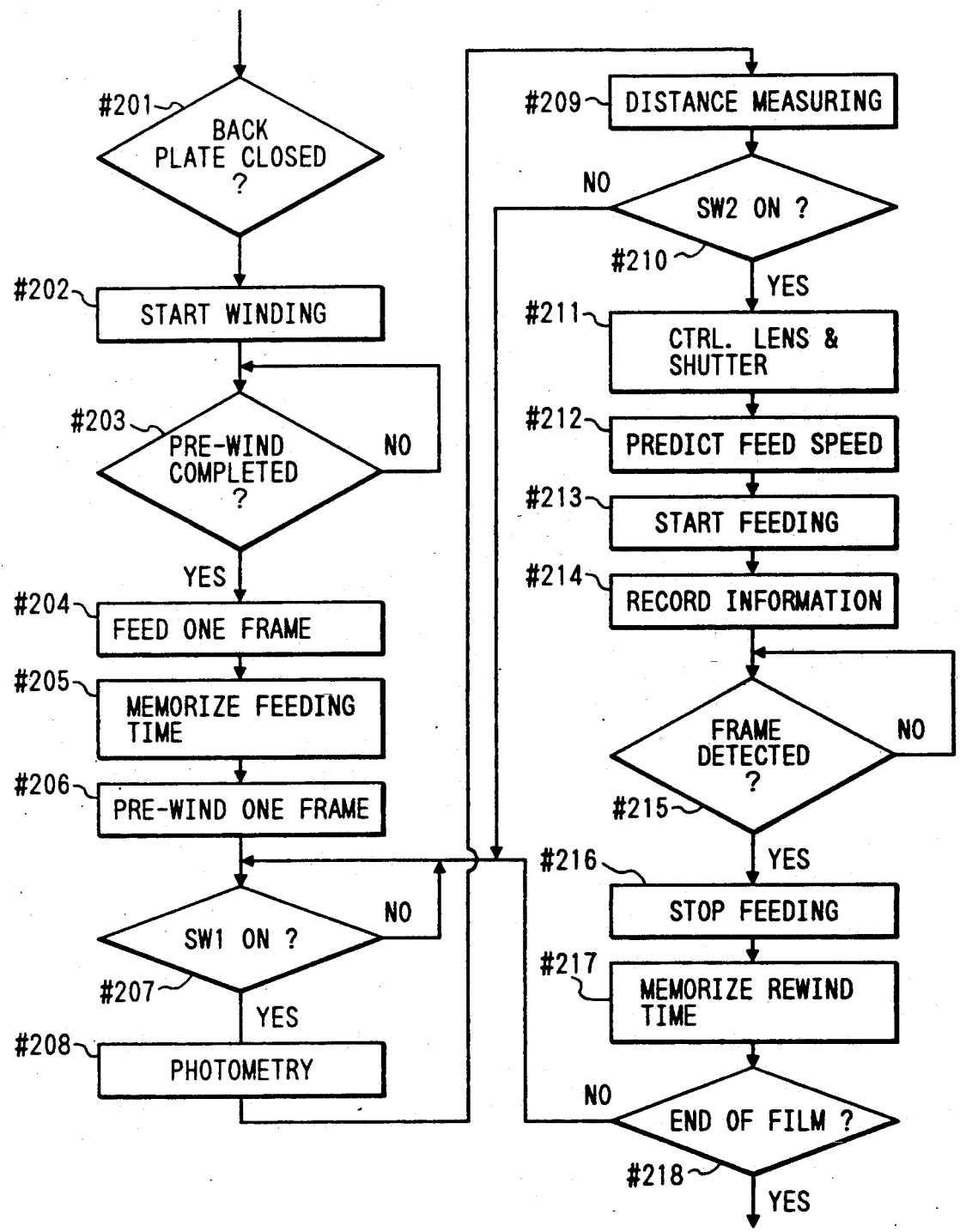
FIG. 22 is a flow chart showing control sequence of the embodiment shown in FIG. 21.

FIG. 21 is a schematic block diagram of another embodiment of the present invention, of which functions will be explained in the following with reference to a flow chart shown in FIG. 22.

At first a controller 101 discriminates, in a step 201, whether a rear cover has been closed, and, if in a closed state indicating that a film cartridge has been loaded, drives film feeding means 104 in a step 202 thereby starting the winding of a film provided thereon with magnetic memory areas. A subsequent step 203 discriminates whether all the frames of the film have been wound, namely whether the pre-winding operation has been completed, and, if not, the above-explained operations are repeated. Thereafter, upon confirmation of completion of the pre-winding operation, the sequence proceeds to a step 204.

In the step 204, the controller 104 sends an instruction for a frame winding to the film feeding means 104, thereby rewinding the film by a frame. The time required for said rewinding of a frame is counted by counter means 102, and a next step 205 memorizes, in a memory 103, the time required for said simulated rewinding of a frame. In a next step 206 pre-winding instruction means 101C in the controller 101 effects pre-winding of said frame, subjected to said simulated rewinding, to the phototaking position, thereby enabling the phototaking operation from the first frame.

A step 207 discriminates the state of a switch SW1 to be turned on by the depression of a shutter release button over a first stroke, and, if turned on, steps 208, 209 activate unrepresented photometry means and distance measuring means to obtain information on measured light and distance. Then a step 210 discriminates the state of a switch SW2 to be turned on by the depression of the shutter release button over a second stroke. If said switch SW2 is closed, the sequence proceeds to a step 211 for effecting lens control and shutter control in the known manner, thereby effecting lens focusing and exposure of the film.

A next step 212 causes the calculation means 101A of the controller 101 to predict the film feeding speed of the first frame, based on the feeding time memorized in the step 205. The film feeding speed for any subsequently frame is predicted from the feeding time for the immediately preceding frame, to be stored in a step to be explained later.

In a next step 213, the controller 101 instructs the film feeding means 104 to effect film feeding according to thus predicted feeding speed. A step 214 drives a magnetic head 105, thereby recording various information, such as shutter time, diaphragm aperture, phototaking date, comment etc. into the magnetic memory area of the film which is fed as explained above, with a recording frequency determined from said film feeding speed.

A next step 215 discriminates whether the feeding of said photographed frame has been completed, and, if completed, a step 216 instructs the film feeding means 104 to terminate the film feeding. Then a step 217 stores, in the memory 103, the content of counter means 102, which counts the actual time required for film rewinding of a frame, from the step 213 to 216. Then a step 218 discriminates whether the film has come to the end, namely whether all the frame have been photographed, and, if not, the sequence returns to the step 207 to repeat the above-explained operations. On the other hand, if all the frames have been photographed, there is initiated the known operation of rewinding all the film into the film cartridge.

In the above-explained embodiment applied to a camera of pre-winding system, the film feeding speed for the first image frame is predicted from the feeding time in a simulated rewinding operation, and the film feeding speed for any subsequent frame is predicted from that required for the immediately preceding frame. It is therefore rendered possible to predict appropriate film feeding speed not only for the second or subsequent frame but also for the first frame, thereby achieving appropriate information recording in each frame.

Figure 23A:
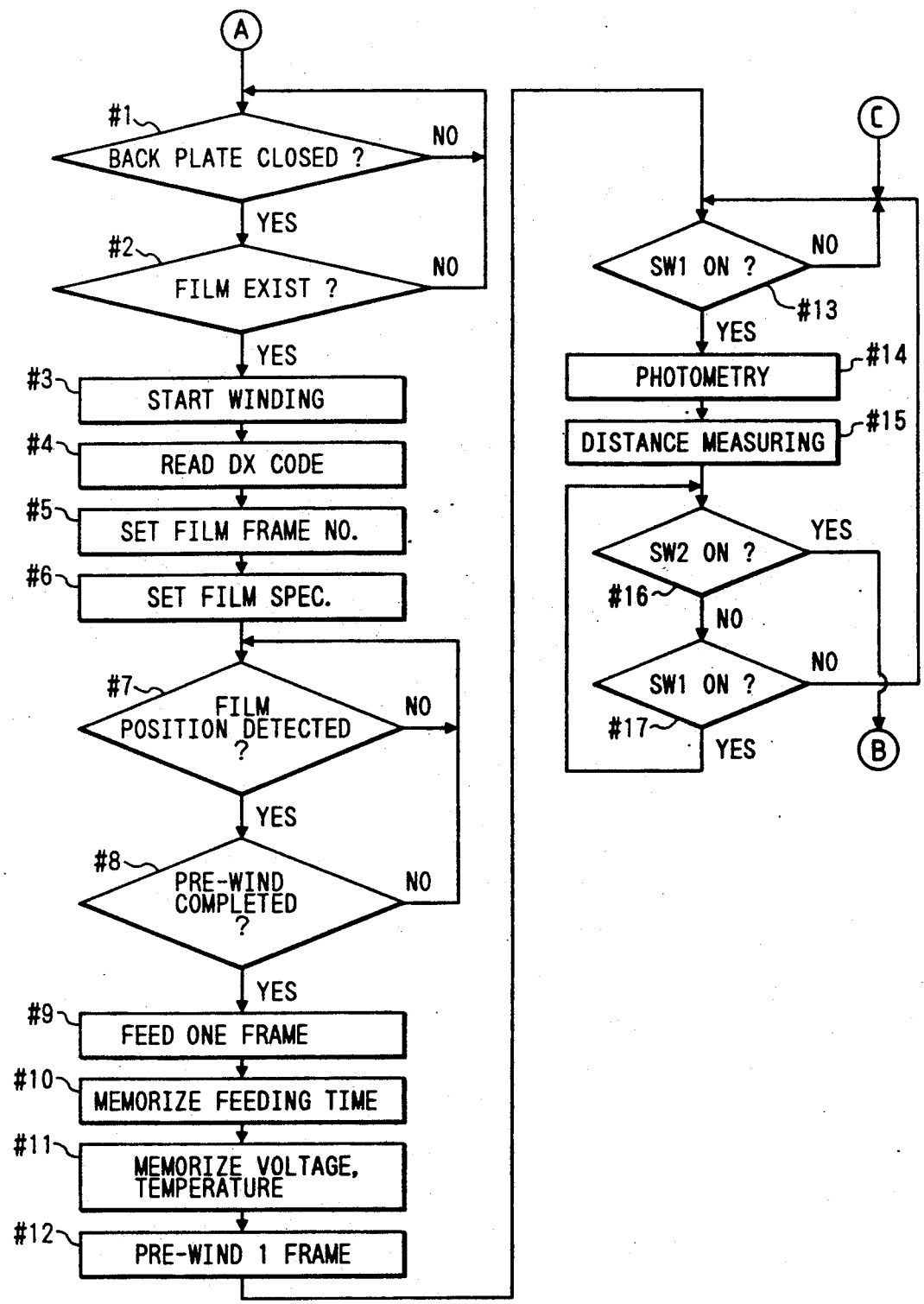
FIGS. 23A and 23B are flow charts showing details of the flow shown in FIG. 22.
Figure 23B:
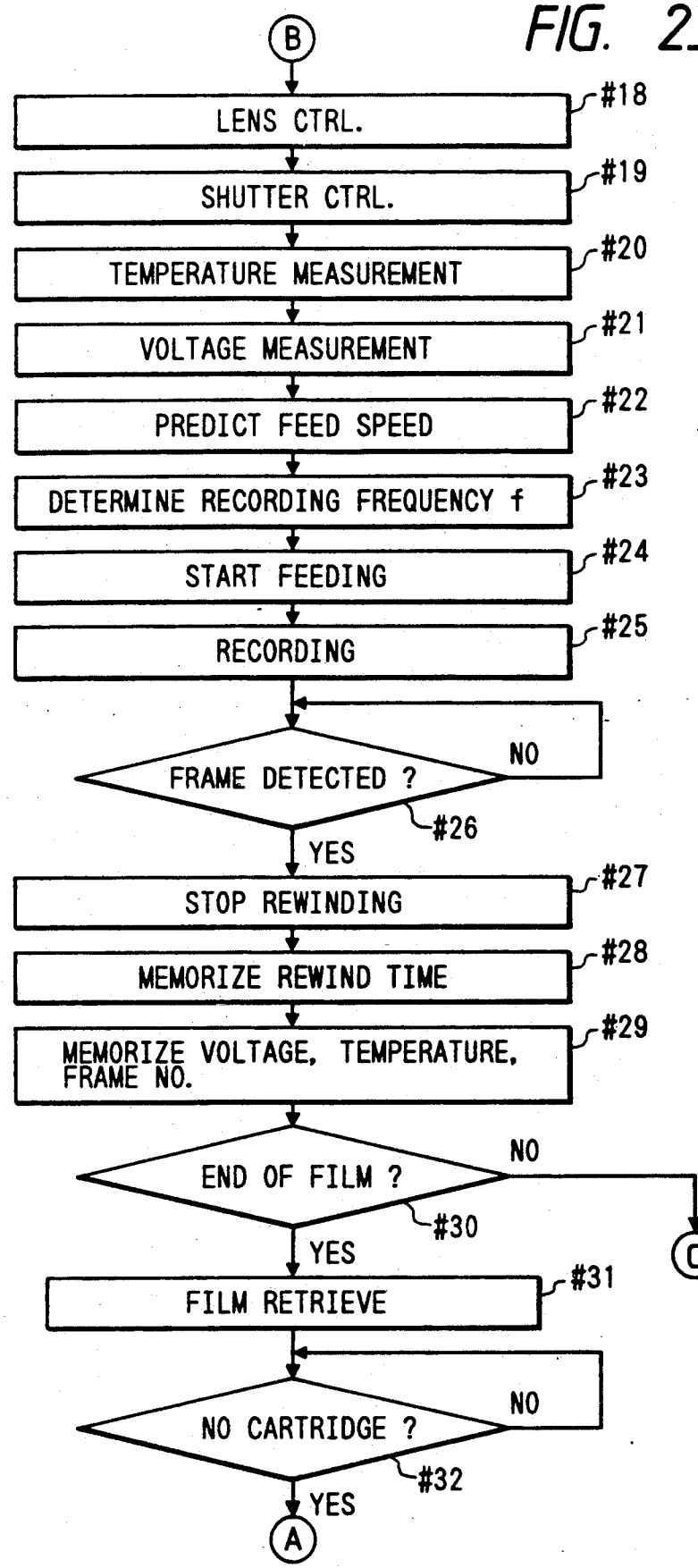

FIGS. 23A and 23B are flow charts showing details of the process flow shown in FIG. 22, and the control sequence of the present embodiment will be explained in the following with reference to said flow charts:

Step 1: It discriminates whether the rear cover is closed, from the state of a rear cover switch 56, and, if not closed, this step 1 is repeated, but, if closed, the sequence proceeds to a step 2;

Step 2: It discriminates whether a film cartridge has been loaded in the cartridge chamber 3, from the state of a switch 57, and, if not, the sequence returns to the step 1, but, if loaded, the sequence proceeds to a step 3;

Step 3: It drives an unrepresented film feeding motor in the forward direction through a motor control circuit 59, thereby starting the film winding;

Step 4: It activates a DX code reading circuit 58 to read the total number of frames on the film and the kind of film, from a DX code provided on the film cartridge. Said reading may be conducted from the film by means of the magnetic head 6, but, in the present embodiment, it is achieved from the DX code provided on the film cartridge;

Step 5: This step sets the total number of frames read in the step 4;

Step 6: It sets the kind of film (manufacturer, reversal/negative type, film sensitivity) read in the step 4;

Step 7: It discriminates whether a frame has been detected by a frame position detecting circuit 63 which detects the frame position for example from perforations, and, if not detected, the step 7 is repeated, but, if detected, the sequence proceeds to a step 8. The number of frames is counted by the detection of feeding of a frame in this step;

Step 8: It discriminates, by the count of frame number, whether the pre-winding operation has been conducted to the number of frames set in the step 5, and, if not, the sequence returns to the step 7, but, if the pre-winding operation is completed, the sequence proceeds to a step 9;

Step 9: It reverses the film feeding motor by the motor control circuit 59, thereby winding the film by a frame;

Step 10: It reads, from the internal timer, the time required for the film feeding in the step 9, and stores said time in the RAM in the microcomputer 53;

Step 11: It activates a temperature detecting circuit 64 and a voltage detecting circuit 65, thereby obtaining and memorizing the information on temperature and power source voltage.

Step 12: It drives the film feeding motor in the forward direction by the motor control circuit 59, thereby effecting the pre-winding operation again and advancing the above-mentioned frame to the phototaking position;

Step 13: The sequence enters a stand-by state for the turning-on of the switch SW1, and, upon closing of said switch, the sequence proceeds to a step 14;

Step 14: It activates a photometry circuit 51 to obtain the information on the object luminance;

Step 15: It activates a distance measuring circuit 52 to obtain the information on the object distance;

Step 16: It discriminates the state of a switch SW2, and, if on, the sequence proceeds to the step 18 in FIG. 23B, but, if off, the sequence proceeds to a step 17;

Step 17: It again discriminates the state of the switch SW1, and, if on, the sequence returns to the step 16, but, if off, the sequence returns to the step 13;

Step 18: It focuses the phototaking lens by controlling a lens control circuit 61 according to the object distance information obtained in the step 15;

Step 19: It effects exposure of the film by controlling a shutter control circuit 60 based on the object luminance information obtained in the step 14;

Step 20: In order to know the current temperature in the camera, it activates a temperature detecting circuit 64, thereby entering the temperature information;

Step 21: In order to know the current power source voltage, it activates a voltage detecting circuit 65, thereby entering the power source voltage information;

Step 22: It predicts the film feeding speed for the photographed frame, in consideration of the feeding time stored in the step 10 or in a step 28 to be explained later, the number of frames obtained in the step 5, the kind of film obtained in the step 6, the temperature and power source voltage obtained in the step 11, the temperature obtained in the step 20, the power source voltage obtained in the step 21, and the power source voltage, temperature and frame number obtained in a step 29 to be explained later. The frame number is taken into consideration, since the feeding speed varies by a change in the apparent spool diameter of the film cartridge with the progress of the rewinding operation;

Step 23: It determines the recording frequency f for information recording into the magnetic memory area, based on the result of said step 22;

Step 24: It reverses the film feeding motor through the motor control circuit 59, with thus predicted feeding speed, thereby starting the film rewinding;

Step 25: It drives the magnetic head 6 through the head control circuit 62, thereby recording the aforementioned information into the magnetic memory area provided on the film under feeding;

Step 26: It discriminates whether a frame position has been detected by the frame position detecting circuit 63, and, upon detection, the sequence proceeds to a step 27;

Step 27: It inhibits the drive of the film feeding motor through the motor control circuit 59, thereby terminating the rewinding operation;

Step 28: It memorizes the time required for the feeding of the photographed frame, from the step 24 to 27;

Step 29: It activates the temperature detecting circuit 64 and the voltage detecting circuit 64 and the voltage detecting circuit 65 to obtain information on temperature and power source voltage, stores said information, and also memorizes the current frame number obtained from the frame position detecting circuit 63;

Step 30: It discriminates whether all the frames have been exposed, based on the total number of frames set in the step 5 and on the current frame number, and, if not, the sequence returns to the step 13 to repeat the above-explained operations. If all the frames have been exposed, the sequence proceeds to a step 31;

Step 31: It reverses the film feeding motor through the motor control circuit 59, thereby rewinding all the film into the film cartridge;

Step 32: It discriminates whether the film cartridge is present in the cartridge chamber 3 from the state of the switch 57, and, if absent, the sequence returns to the step 1 in FIG. 23A.

In case temperature, change in voltage, kind of film etc. are taken into consideration in the prediction of the feeding speed in the step 22, correction are conducted as already explained in relation to FIGS. 7 to 10.

Also in the present embodiment, the information recording can be achieved in stabler manner by executing the steps 20 to 25 according to a process shown in FIG. 11.

Figure 24:
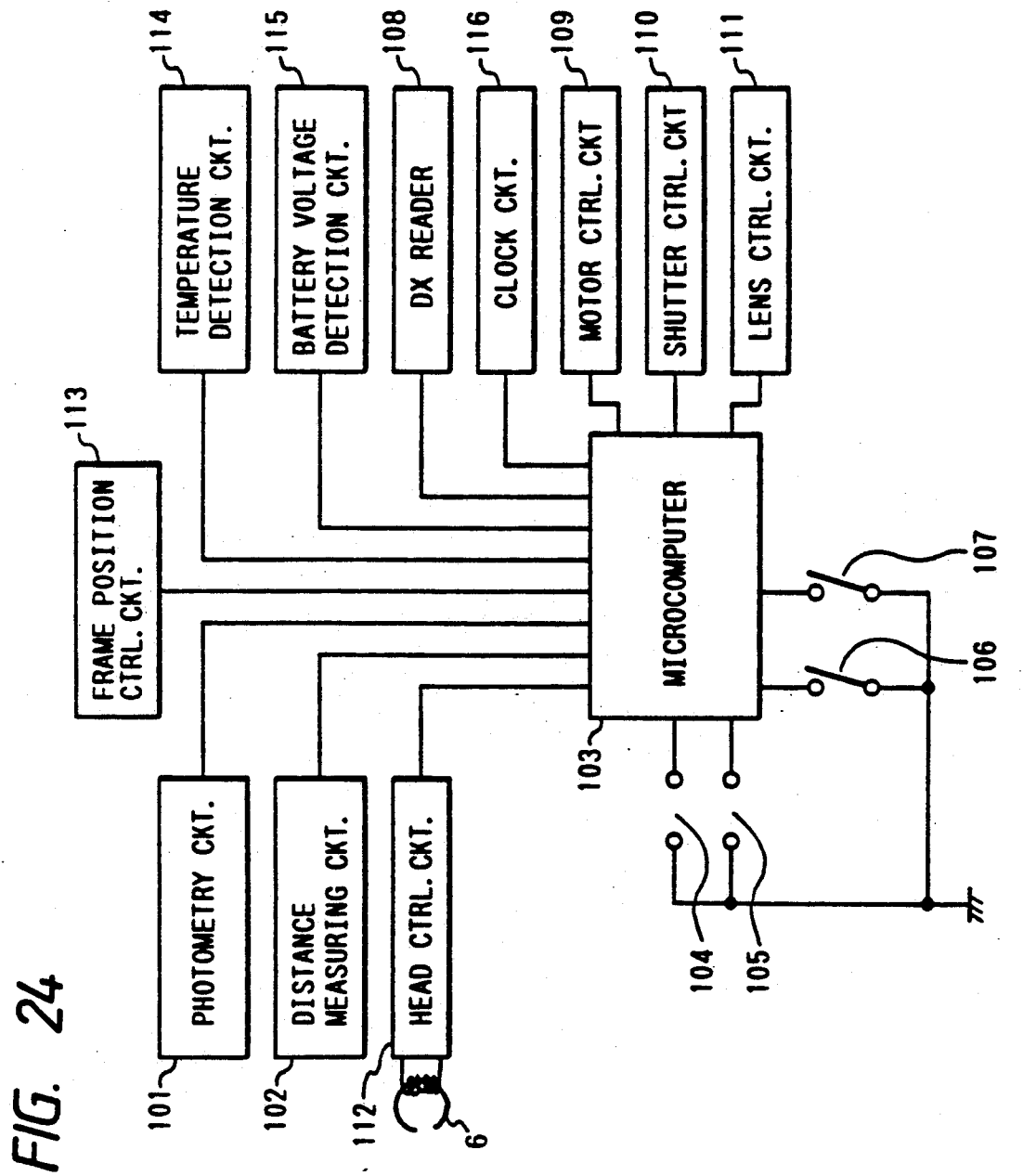
FIG. 24 is a block diagram of still another embodiment of the present invention.

FIG. 24 is a block diagram of a camera constituting another embodiment of the present invention, where shown are a microcomputer 103 for controlling the entire circuit; a photometry circuit 101 for measuring the luminance of an object to be photographed; a distance measuring circuit 102 for measuring the distance to said object in order to focus a phototaking lens; a switch 104 (SW1) linked with a first stroke of an unrepresented shutter release button of the camera; a switch 105 (SW2) linked with a second stroke of said shutter release button and serving to initiate a phototaking operation; a rear cover switch 106 to be turned on and off by the opening and closing of a rear cover of the camera; a switch 107 for detecting the presence or absence of a film cartridge; a motor control circuit 109 for winding or rewinding the film respectively in the forward or reverse rotation; a shutter control circuit 110 for controlling the exposure of the film; a lens control circuit 111 for focusing the lens to the object in response to the output of the distance measuring circuit 102; a head control circuit 112 for recording or reading information into or from a magnetic memory area of the film by means of a magnetic head 6; a DX code reading circuit 108 for reading a DX code of the film cartridge, indicating the number of frames and the kind of loaded film; a frame position detecting circuit 113 for detecting perforations of the film or the amount of feeding thereof, thereby detecting each frame of the film and exactly identifying a frame to be exposed; a temperature detecting circuit 114 which is constructed independently in the present embodiment but may be integrated with the photometry circuit 101; a battery voltage detecting circuit 115 for providing the microcomputer 103 with the battery voltage information after A/D conversion; and a clock circuit 116 for releasing time information such as date.

Figure 25B:
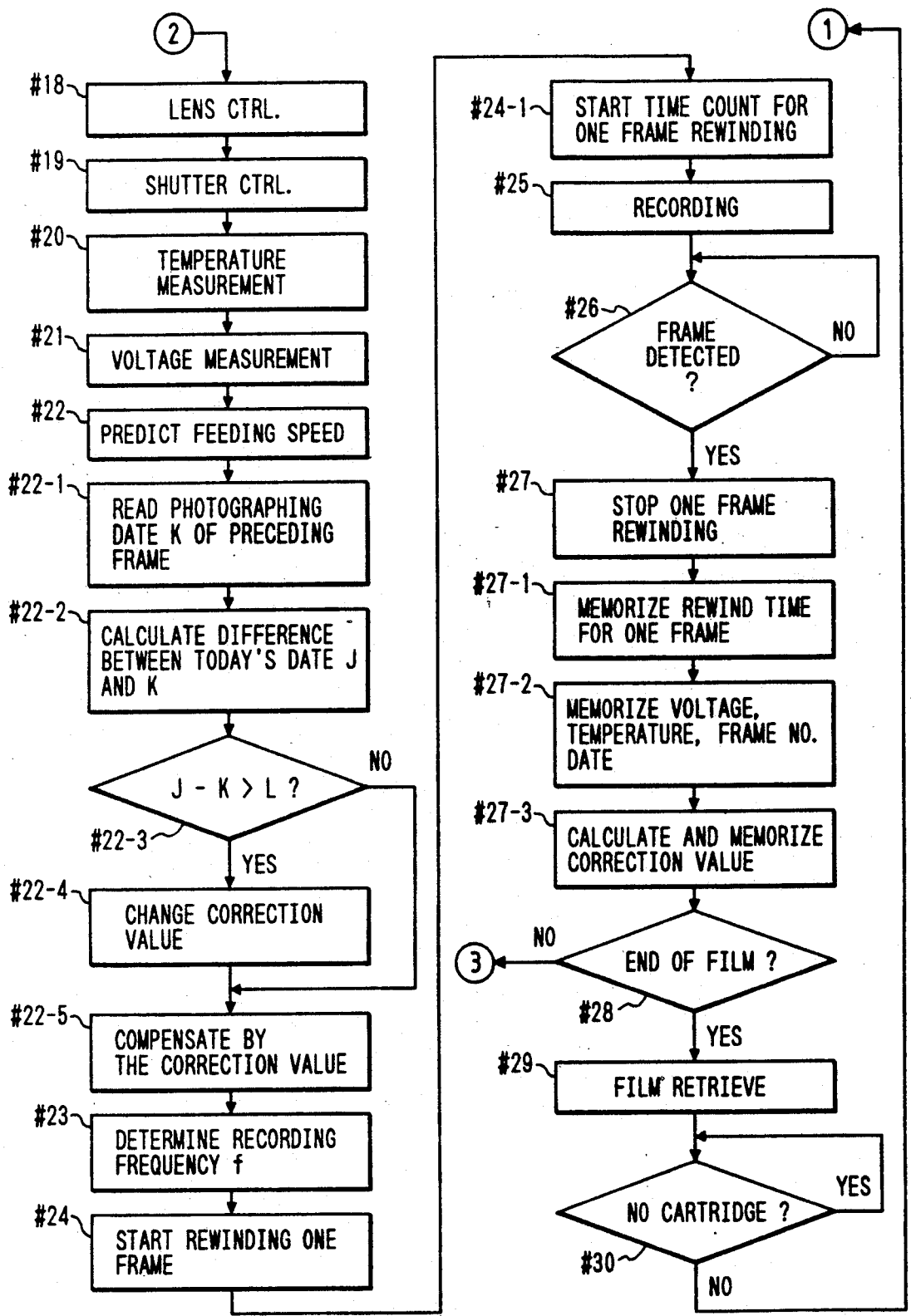

The functions of the above-explained circuit will be explained in the following, with reference to a flow chart in FIG. 25, showing the control sequence of the microcomputer 103.

A step 1 discriminates whether the rear cover is closed, according to the state of the rear cover switch 106, and, if not closed, the step 1 is repeated. If closed, a step 2 discriminates, by the state of the switch 107, whether a film cartridge is loaded in the cartridge chamber 3, and, if not, the sequence returns to the step 1. If loaded, the sequence proceeds to a step 3.

The step 3 starts the film winding by the motor control circuit 109, and a step 4 starts the measurement of winding time, by an internal timer of the microcomputer 103. A step 5 enters the information of DX code, such as the number of frames, kind of film, film sensitivity etc. of the loaded film by the DX code reading circuit 108, and a step 6 stores said information of DX code in a memory of the microcomputer 103. Said information may be obtained through the magnetic head 6.

Then a step 7 discriminates whether the frame position has been detected by the frame position detecting circuit 113, and, if not, the step 7 is repeated, but, if detected, the sequence proceeds to a step 8.

Based on the timing of frame position detected in the step 7, the step 8 calculates the winding time required for feeding of a frame, and stores said winding time in the memory of the microcomputer 103. The present embodiment is applied to a camera of so-called pre-winding system in which all the film is wound on the spool 7 after the loading of the film cartridge.

Then a step 9 stores, in the memory of the microcomputer 103, a frame number corresponding to the frame winding time memorized in the step 8.

A step 10 then memorizes, in the memory of the microcomputer 103, the current temperature of the camera entered from the temperature detecting circuit 114.

A step 11 memorizes, in said memory of the microcomputer 103, the battery voltage entered from the battery voltage detecting circuit 115.

A step 12 discriminates, based on the frame number stored in the step 9, whether the pre-winding operation of the film has been completed to the total number of frames stored in the step 5, and, if not, the sequence returns to the step 7 for continuing the pre-winding operation, but, if completed, the sequence proceeds to a step 13 to enter a stand-by state for awaiting the turning-on of the switch 104 (SW1).

When the switch 104 is turned on, a step 14 enters the object luminance from the photometry circuit 101, and a step 15 enters the object distance from the distance measuring circuit 102. A next step 16 discriminates the state of the switch 105 (SW2), and, if off, a step 17 discriminates the state of the switch 104 (SW1). If it is off or on, the sequence respectively returns to the step 13 or 6.

On the other hand, if the step 16 identifies that the switch 105 is on, a step 18 focuses the phototaking lens to the object by the lens control circuit 111, based on the distance information obtained in the step 15.

Then a step 19 provides the film with an appropriate exposure through the shutter control circuit 110, based on the object luminance obtained in the step 14.

A step 20 enters the temperature in the camera from the temperature detecting circuit 114, and a step 21 enters the battery voltage from the battery voltage detecting circuit 115.

A next step 22 predicts the film feeding speed in a frame rewinding, based on the number of frames and the kind of film stored in the step 5, the winding time stored in the step 8, the frame number stored in the step 9, the temperature stored in the step 10, the battery voltage stored in the step 11, the temperature entered in the step 20, battery voltage entered in the step 21, and the current photographed frame number. The predicting calculation conducted in the step 22 is same as that in the step 22 of the foregoing embodiment shown in FIGS. 6A and 6B. A next step 22-1 reads the date K of a preceding frame, memorized in a step 27-2. A step 22-2 enters the current date J from the clock means 116 and calculates the difference from the date K obtained in the step 22-1. If a step 22-3 identifies that said difference is larger than a predetermined number L of days, the situation is considered to have changed from that in the photographing date of the preceding frame, and a step 22-4 changes a correction value, obtained in a step 27-3, so as to increase the magnetic recording frequency to be explained later. Then the sequence proceeds to a step 22-5. On the other hand, if the step 22-3 identifies that said difference is within said predetermined number of days, the situation is considered to have not changed from that of the photographing date of the preceding frame, and the sequence proceeds, without change in said correction value, to the step 22-5 for correcting the feeding speed, predicted in the step 22, with said correction value. Then a step 23 determines the frequency f of magnetic recording by the head control circuit 112, according to the result of prediction of the step 22, corrected in the step 22-5. The change of the correction value in the step 22-4 for increasing the recording frequency is to enable recording of all the information, even if the film feeding speed has become faster in comparison with that in the photographing date of the preceding frame.

Then a step 24 starts rewinding of a frame into the cartridge by the motor control circuit 109, then a step 24-1 starts the measurement of feeding time, and a step 25 effects magnetic recording in the magnetic memory area of the film, with the frequency f determined in the step 23.

Then a step 26 discriminates whether a frame position has been detected by the frame position detecting means 113, and, upon detection, a step 27 terminates the frame rewinding operation.

A step 27-1 memorizes the actual time required for a frame rewinding, then a step 27-2 memorizes the battery voltage, temperature, frame number and date, and a step 27-3 analyzes the difference from the already predicted winding time, based on the information stored in the steps 27-1 and 27-2, and calculates and stores a correction value for the feeding speed to be predicted next time in the step 22. In this manner the steps 27-1, 27-2 and 27-3 memorize the actual feeding time, temperature, power source voltage and frame number, thereby correcting the feeding time predicted in the step 22 or correcting the data used for said prediction.

A step 28 discriminates whether all the frames of the film have been photographed, based on the current frame number and the number frames stored in the step 6, and, if not, the sequence returns to the step 13, but, if all the frames have been exposed, a step 29 activates the motor control means 109 to effect the film rewinding for a predetermined time, thereby rewinding all the film into the cartridge.

Then a step 30 discriminates whether the film cartridge has been removed from the camera, by the state of the switch 107, and, if taken out, the sequence returns to the step 1.

Also in this embodiment, if the temperature, change in battery voltage and kind of film are taken into consideration in the prediction of the film feeding speed, there is adopted the correction explained in relation to FIGS. 7 to 10.

Furthermore, also in this embodiment, the recording may be conducted after the stabilization of the voltage as shown in FIG. 11.

Furthermore, this embodiment is also applicable to a camera of normal winding system, by employing the process flow shown in FIG. 15.

In the foregoing embodiments, the magnetic recording frequency onto the film is determined according to the predicted film feeding speed, but the present invention is naturally likewise applicable to the case of determining the magnetic reading frequency from the film, based on the predicted film feeding speed.

Also in the embodiment shown in FIG. 25, the predetermined number of days in the step 22-3 may naturally be selected arbitrarily and is not limited to the number of days.

I claim:

1. A recording device for use in a camera capable of recording information on a film in the course of feeding thereof after the phototaking operation of each frame, or a camera provided with said recording device, comprising:
    a) a recording member for recording information on the film;
    b) a first detection circuit for detecting information of film feeding speed at a timing of film feeding, independent from the film feeding after the phototaking operation of each frame;
    c) a calculation circuit for calculating information of film feeding speed after the phototaking operation of each frame, based on the information on the film feeding speed detected by said first detection circuit; and
    d) a control circuit for controlling a recording operation by said recording member, based on the value calculated by said calculation circuit.

2. A recording device or a camera according to claim 1, wherein said first detection circuit is adapted to detect the time required for feeding of the film by a predetermined amount, and to form said information on the feeding speed according to said time.

3. A recording device or a camera according to claim 1, wherein said calculation circuit is adapted to calculate the film feeding speed for each frame, in consideration of the frame number in the film feeding after phototaking operation.

4. A recording device or a camera according to claim 1, wherein said calculation circuit is adapted to calculate the information on film feeding speed, according to the kind of film.

5. A recording device or a camera according to claim 1, further comprising a second detection circuit for detecting information of feeding speed for each frame after phototaking operation, wherein, at the feeding of a next frame, the information detected by said second detection circuit is utilized as a correction value for correcting the value calculated by said calculation circuit, and said control circuit controls said recording operation based on thus corrected calculated value.

6. A recording device or a camera according to claim 1, further comprising a third detection circuit for detecting the lapse of the time from the preceding film feeding operation, and said calculated value is corrected in consideration of said elapsed time.

7. A recording device or a camera according to claim 5, further comprising a third detection circuit for detecting the lapse of the time from the preceding film feeding operation, and said correction value is regulated in consideration of said elapsed time.

8. A recording device or a camera according to claim 1, wherein said recording member includes a magnetic head for information recording in a magnetic recording part provided on the film, and said control circuit is adapted to control the frequency of an alternating signal applied to said magnetic head, based on said calculated value.

9. A camera of a type in which a film in a film cartridge is initially wound on a film winding shaft and is fed, at phototaking operations, frame by frame into said film cartridge, or a recording device for use in the camera of the above-mentioned type, comprising:
   a) a magnetic head for information recording in a magnetic recording part provided on said film;
   b) a first detection circuit for detecting information of the film feeding speed, in the course of film feeding from said film cartridge to said film winding shaft;
   c) a calculation circuit for calculating information of the film feeding speed at the film feeding by a frame into the film cartridge at a phototaking operation, based on the information of the feeding speed detected by said first detection circuit; and
   d) a control circuit for controlling the state of recording operation by said magnetic head, according to the information of the feeding speed calculated by said calculation circuit.

10. A camera or a recording device according to claim 9 wherein said first detection circuit is adapted to detect a time required for the feeding of each frame, as the information of the feeding speed of each frame.

11. A camera or a recording device according to claim 10, further comprising a frame number detection circuit for detecting information on the frame number of the fed film, wherein said calculation circuit is adapted to calculate information of the feeding speed for each frame after a phototaking operation, based on the information of the frame number detected by said frame number detection circuit and the information of the feeding speed for each frame detected by said first detection circuit.

12. A camera or a recording device according to claim 10, further comprising a frame number detection circuit for detecting information on the frame number of the fed film; a memory circuit for storing the information of the feeding speed for each frame detected by said first detection circuit, in correlation with the information of the frame number detected by said frame number detection circuit; and a readout circuit for reading the information of the feeding speed of each frame, stored in said memory circuit, at the film feeding after a phototaking operation, according to the information of the frame number detected by said frame number detection circuit, wherein said calculation circuit is adapted to calculate the information of the feeding speed for a frame at the film feeding into the film cartridge, based on the information on the feeding speed read by said readout circuit.

13. A camera of a type in which a film in a film cartridge is initially wound on a film winding shaft and is fed, at phototaking operations, frame by frame into said film cartridge, or a recording device for use in the camera of the above-mentioned type,
   a) a magnetic head for information recording in a magnetic recording part provided on said film,
   (b) a first detection circuit for detecting information of the film feeding speed, in the course of film feeding from said film cartridge to said film winding shaft;
   c) a film information detection circuit for detecting film information corresponding to the kind of said film;
   d) a calculation circuit for calculating information of the feeding speed at the film feeding by a frame into said film cartridge after a phototaking operation, based on the information on the feeding speed detected by said first detection circuit and the film information detected by said film information detection circuit; and
   e) a control circuit for controlling the state of recording operation by said magnetic head, according to the information of the feeding speed calculated by said calculation circuit.

14. A camera or a recording device according to claim 13, wherein said first detection circuit is adapted to detect a time required for the feeding of each frame, as the information of the feeding speed of each frame.

15. A camera of a type in which a film in a film cartridge is initially wound on a film winding shaft and is fed, at phototaking operations frame by frame into said film cartridge, or a recording device for use in the camera of the above-mentioned type, comprising:
   a) a magnetic head for information recording in a magnetic recording part provided on said film;
   b) a first detection circuit for detecting information of the film feeding speed, in the course of film feeding from said film cartridge to said film winding shaft;
   c) a second detection circuit for detecting information of the feeding speed for each frame at the film feeding by a frame into the film cartridge after a phototaking operation;
   d) a calculation circuit for calculating information on the feeding speed for a frame to be fed next time, based on the information of the feeding speed of a previously fed frame, detected by said second detection circuit, and the information of the feeding speed detected by said first detection circuit; and
   e) a control circuit for controlling the state of recording operation by said magnetic head, according to the information of the feeding speed calculated by said calculation circuit.

16. A recording device for use in a camera capable of recording information on a film in the course of feeding thereof after the phototaking operation of each frame, or a camera provided with said recording device, comprising:
   (a) a recording member for recording information on the film;
   (b) a calculation circuit for calculating, in prediction, information on the film feeding speed of each frame, prior to the feeding of a corresponding frame; and (c) a control circuit for controlling a recording operation by said recording member, based on the value calculated by said calculation circuit.

17. A recording device or a camera according to claim 16, further comprising a correction value forming circuit for detecting information of the film feeding speed of a frame at a frame feeding and forming a correction value for a next frame feeding, wherein said calculation circuit is adapted to calculate, in prediction, information of the feeding speed of a next frame, employing said correction value as feedback information.

18. A recording device or a camera according to claim 16, further comprising a time detection circuit for detecting the elapsed time from the film feeding operation of a preceding frame, wherein said calculation circuit is adapted to calculate, in prediction, information of the frame feeding speed for a next frame feeding operation, in consideration of the elapsed time detected by said time detection circuit.

19. A recording device or a camera according to claim 17, further comprising a time detection circuit for detecting the elapsed time from the film feeding operation of a preceding frame, wherein said correction value is regulated in consideration of the elapsed time detected by said time detection circuit.

20. A camera or a recording device according to claim 15, further comprising a time detection circuit for detecting the elapsed time from a preceding frame feeding operation, wherein the information of the feeding speed of the preceding frame detected by said second detection circuit is corrected in consideration of the elapsed time detected by said time detection circuit.

21. A camera or a recording device according to claim 9, wherein said control circuit is adapted to control the frequency of an alternating signal applied to said magnetic head, based on said calculated value.

22. A camera of a type in which a film in a film cartridge is initially wound on a film winding shaft and is fed, at phototaking operations, frame by frame into said film cartridge, or a recording device for use in the camera of the above-mentioned type, comprising:
a) a film feeding control circuit for feeding the film, from a state fed to the film winding shaft, by a predetermined amount into said film cartridge and then feeding said film again to said film winding shaft;
b) a first detection circuit for detecting information of the film feeding speed in the course of film feeding by said film feeding control circuit;
c) a recording member for information recording on said film; and
d) a control circuit for controlling the recording operation by said recording member, based on the information detected by said first detection circuit.

23. A camera or a recording device according to claim 22, wherein said recording member includes a magnetic head for information recording in a magnetic recording part provided on the film, and said control circuit is adapted to control the frequency of an alternating signal applied to said magnetic head, based on said information.

24. A camera or a recording device according to claim 22, wherein said first detection circuit is adapted to detect information of the film feeding speed, in the course of film feeding said predetermined amount.

25. A camera or a recording device according to claim 22, wherein said control circuit is adapted to activate said recording member at the film feeding by a frame into the film cartridge after a phototaking operation.

26. A recording device for use in a camera capable of recording information on a film in the course of feeding thereof after the phototaking operation of each frame, or a camera provided with said recording device, comprising:
a) a recording member for recording information on the film;
b) a first detection circuit for detecting information of the film feeding speed at the feeding of a frame; and
c) a control circuit for controlling the recording operation by said recording member at a next frame feeding, based on the information detected by said first detection circuit.

27. A recording device or a camera according to claim 1, wherein said control circuit functions when the power supply voltage becomes stable after the start of film feeding.

* * * * *

UNITED STATES PATENT AND TRADEMARK OFFICE
CERTIFICATE OF CORRECTION

PATENT NO. : 5,184,161

DATED : February 2, 1993

INVENTOR(S) : Akira EGAWA

It is certified that error appears in the above-identified patent and that said Letters Patent is hereby corrected as shown below:

COLUMN 3:

line 63, "in" should read --in a--.

COLUMN 5:

line 39, "However" should read --However,--.

COLUMN 7:

line 54, "step 17 respectively" should read --step 17, respectively,--; and
    line 57, "respectively" should read --respectively,--.

COLUMN 9:

line 24, "amound" should read --amount--.

COLUMN 10:

line 46, "Also" should read --Also,--;
    line 65, "quently" should read --quently,--; and
    line 67, "Thus" should read --Thus,--.

COLUMN 11:

line 3, "Also" should read --Also,--;
    line 6, "preduction" should read --prediction--; and
    line 30, "However" should read --However,--.

UNITED STATES PATENT AND TRADEMARK OFFICE
CERTIFICATE OF CORRECTION

PATENT NO. : 5,184,161

DATED : February 2, 1993

INVENTOR(S) : Akira EGAWA

It is certified that error appears in the above-identified patent and that said Letters Patent is hereby corrected as shown below:

COLUMN 12:

line 58, "207," should read --207 and--.

COLUMN 13:

line 35, "namely" should read --namely,--; and
line 48, "namely" should read --namely,--.

COLUMN 14:

line 4, "following" should read --following,--;
line 6, "preducted" should read --predicted--;
line 30, "step 202 thereby" should read --step 202, thereby,--;
line 34, "namely" should read --namely,--;
line 45, "step 206" should read --step 206,--; and
line 66, "quently" should read --quent--.

COLUMN 21:

line 41, "claim 9" should read --claim 9,--.

UNITED STATES PATENT AND TRADEMARK OFFICE
CERTIFICATE OF CORRECTION

PATENT NO. : 5,184,161

DATED : February 2, 1993

INVENTOR(S) : Akira EGAWA

It is certified that error appears in the above-identified patent and that said Letters Patent is hereby corrected as shown below:

<u>COLUMN 22</u>:

```
line 8, "type," should read --type, comprising:--;
line 9, "film," should read --film;--; and
line 10, "(b)" should read --b)--.
```

Signed and Sealed this

Eighteenth Day of January, 1994

BRUCE LEHMAN

*Attesting Officer*    *Commissioner of Patents and Trademarks*